United States Patent
Sasaki et al.

(10) Patent No.: US 6,564,338 B1
(45) Date of Patent: *May 13, 2003

(54) INFORMATION RECORDING MEDIUM, AND METHOD AND APPARATUS FOR MANAGING DEFECT THEREOF

(75) Inventors: Shinji Sasaki, Osaka (JP); Motoshi Ito, Osaka (JP); Hiroshi Ueda, Hirakata (JP); Yoshihisa Fukushima, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/596,446

(22) Filed: Jun. 16, 2000

Related U.S. Application Data

(63) Continuation of application No. 09/369,815, filed on Aug. 6, 1999.

(30) Foreign Application Priority Data

Oct. 22, 1998 (JP) .......................... 10-300803

(51) Int. Cl.[7] ............................... G06F 11/00
(52) U.S. Cl. ......................... 714/5; 369/275.3
(58) Field of Search ................... 714/5, 42, 710, 714/723; 711/205, 206, 207; 369/275.3

(56) References Cited

U.S. PATENT DOCUMENTS

| | | | | |
|---|---|---|---|---|
| 4,631,723 A | * | 12/1986 | Rathbun ................. 714/710 |
| 5,005,165 A | | 4/1991 | Yamanaka et al. |
| 5,136,711 A | | 8/1992 | Hugard et al. |
| 5,216,655 A | * | 6/1993 | Hearn .................. 369/47.14 |
| 5,271,018 A | | 12/1993 | Chan |
| 5,526,335 A | * | 6/1996 | Tamegai ............... 369/30.04 |
| 5,706,472 A | | 1/1998 | Ruff et al. |
| 5,715,221 A | | 2/1998 | Ito et al. |
| 5,805,564 A | | 9/1998 | Kobayashi et al. |
| 5,822,142 A | * | 10/1998 | Hicken .................. 360/53 |
| 6,043,945 A | * | 3/2000 | Tsuboi .................. 360/53 |
| 6,098,185 A | | 8/2000 | Wilson |
| 6,101,619 A | | 8/2000 | Shin .................... 714/710 |
| 6,298,033 B1 | * | 10/2001 | Tanoue et al. ........... 369/275.3 |
| 6,385,744 B1 | * | 5/2002 | Ando et al. ............. 360/53 |

FOREIGN PATENT DOCUMENTS

| | | |
|---|---|---|
| EP | 0798710 | 10/1997 |
| EP | 0866456 | 9/1998 |
| JP | 1158670 | 12/1987 |
| JP | 3276468 | 4/1990 |
| JP | 4157672 | 5/1992 |
| JP | 5217298 | 8/1993 |
| JP | 8272541 | 10/1996 |
| JP | 8329612 | 12/1996 |
| JP | 9251721 | 9/1997 |
| WO | 9630907 | 10/1996 |
| WO | 9814938 | 4/1998 |

OTHER PUBLICATIONS

ECMA Standardizing Information and Communication Systems; Standard ECMA–272; Feb. 1998; 120 mm DVD Rewritable Disk (DVD–RAM), pp. 42–55.

(List continued on next page.)

Primary Examiner—Robert Beausoliel
Assistant Examiner—Bryce P. Bonzo
(74) Attorney, Agent, or Firm—Renner, Otto, Boisselle & Sklar

(57) ABSTRACT

An information recording medium includes a disk information area; a user area including a plurality of sectors; and a spare area including at least one sector which, when at least one of the plurality of sectors included in the user area is a defective sector, is usable instead of the at least one defective sector. The spare area is located radially inward from the user area. A physical sector number of a sector to which a logical sector number "0" is assigned, among the plurality of sectors included in the user area and the at least one sector included in the spare area, is recorded in the disk information area.

2 Claims, 31 Drawing Sheets

OTHER PUBLICATIONS

European Search Report dated Feb. 3, 2000 re: application No. 9911579.7–2210–.

International Search Report dated Jan. 26, 2000 Re: PCT/JP99/04296.

Japanese Office Action JP11–352467 dated Jan. 24, 2000 (W/English Translation).

Japanese Office Action JP11–352468, dated Jan. 24, 2000, (W/English Translation)–.

Japanese Office Action JP11–240562 (w/English Translation).

Japanese Office Action JP11–240563 (w/English Translation).

* cited by examiner

FIG. 6A

PDL

| Header (total number of entries) |
|---|
| Physical sector number of 1st defective sector |
| Physical sector number of 2nd defective sector |
| Physical sector number of 3rd defective sector |
| ⋮ |
| Physical sector number of m'th defective sector |

1st entry — Physical sector number of 1st defective sector
2nd entry — Physical sector number of 2nd defective sector
3rd entry — Physical sector number of 3rd defective sector
m'th entry — Physical sector number of m'th defective sector

FIG.6B

SDL

| Header (total number of entries) | | | | | |
|---|---|---|---|---|---|
| Physical sector number of 1st defective sector | Physical sector number of 1st replacing sector | | | | |
| Physical sector number of 2nd defective sector | Physical sector number of 2nd replacing sector | | | | |
| Physical sector number of 3rd defective sector | Physical sector number of 3rd replacing sector | | | | |
| ..... | ..... | | | | |
| Physical sector number of n'th defective sector | Physical sector number of n'th replacing sector | | | | |

1st entry
2nd entry
3rd entry
n'th entry

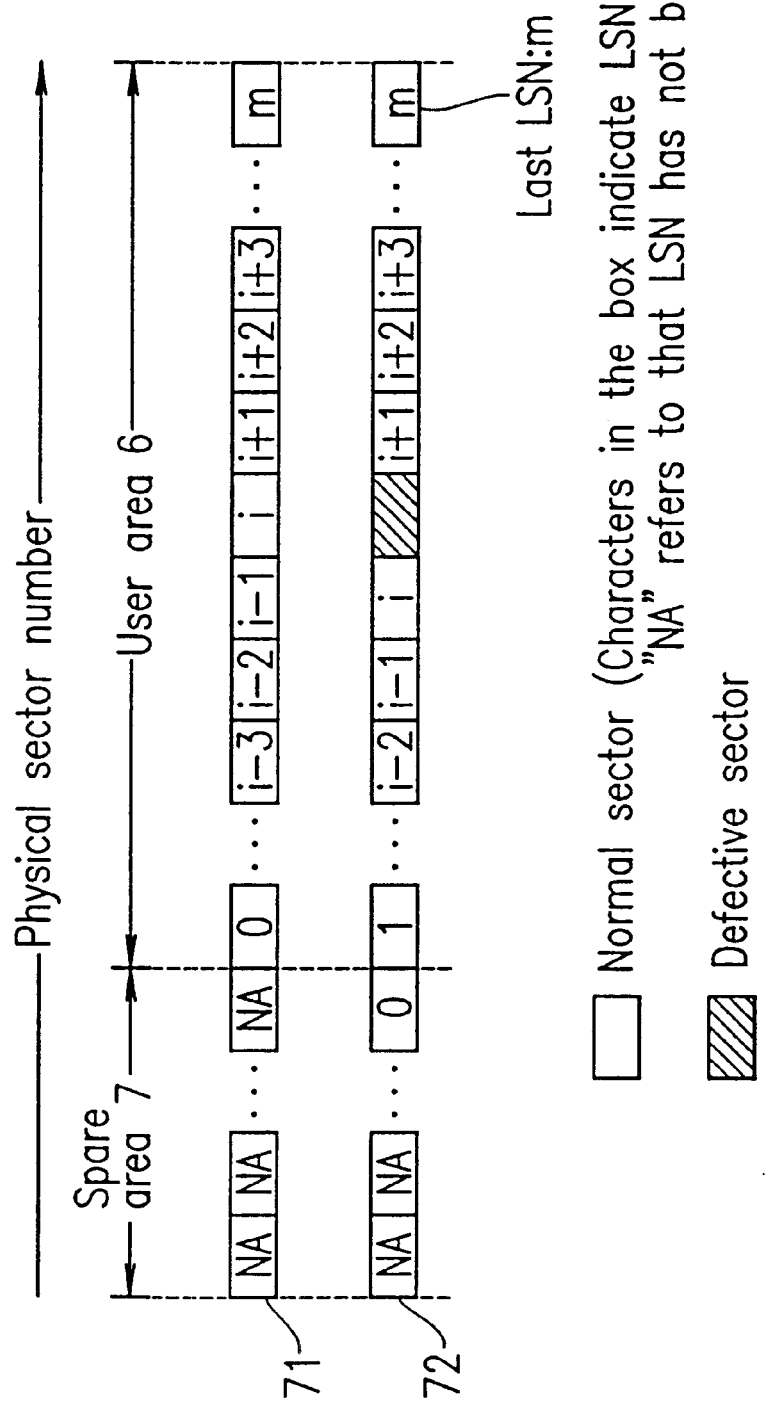

INFORMATION RECORDING MEDIUM, AND METHOD AND APPARATUS FOR MANAGING DEFECT THEREOF

This application is a continuation of Ser. No. 09/369,815 filed Aug. 6, 1999.

BACKGROUND OF THE INVENTION

1. Field of the Invention

The present invention relates to an information recording medium, and a method and an apparatus for managing a defect thereof.

2. Description of the Related Art

A representative information recording medium having a sector structure is an optical disk. Recently, the density and capacity of optical disks have been improved. Therefore, it is important to guarantee the reliability of optical disks.

FIG. 23 shows a logical structure of a conventional optical disk.

As shown in FIG. 23, the optical disk includes two disk information areas 4 and a data recording area 5. The data recording area 5 includes a user area 6 and a spare area 8. The spare area 8 is located radially outward from the user area 6 on the optical disk.

The user area 6 includes a system reservation area 11, a FAT (File Allocation Table) area 12, a root directory area 13, and a file data area 14. The system reservation area 11, the FAT area 12, and the root directory area 13 are collectively referred to as a file management area 10. A first sector of the file management area 10 is located as a sector to which logical sector number "0" (LSN:0) is assigned.

Methods for managing defects of an optical disk are included in ISO/IEC10090 standards (hereinafter, referred to as the "ISO standards") provided by the International Organization of Standardization regarding 90 mm optical disks.

Hereinafter, two methods for managing defects included in the ISO standards are described.

One of the methods is based on a slipping replacement algorithm. The other method is based on a linear replacement algorithm. These algorithms are described in Chapter 19 of the ISO standards.

FIG. 24 is a conceptual view of the conventional slipping replacement algorithm. In FIG. 24, each of the rectangle boxes represents a sector. Characters in each sector represent a logical sector number (LSN) assigned to the sector. The rectangle boxes having an LSN represent normal sectors, and the hatched rectangle box represents a defective sector.

Reference numeral 2401 represents a sequence of sectors including no defective sector in the user area 6, and reference numeral 2402 represents a sequence of sectors including one defective sector in the user area 6.

When a first sector in the user area 6 is a normal sector, LSN:0 is assigned thereto. LSNs are assigned to a plurality of sectors included in the user area 6 in an increasing order from the first sector to which LSN:0 is assigned.

When the user area 6 includes no defective sector, LSN:0 through LSN:m are assigned to the sectors in the user area 6 sequentially from the first sector to a last sector thereof as represented by the sequence of sectors 2401.

If a sector in the sequence of sectors 2401 to which LSN:i is assigned was a defective sector, the assignment of the LSNs is changed so that LSN:i is not assigned to the defective sector but to a sector immediately subsequent to the defective sector. Thus, the assignment of the LSNs are slipped by one sector in the direction toward the spare area 8 from the user area 6. As a result, the last LSN:m is assigned to a first sector in the spare area 8 as represented by the sequence of sectors 2402.

FIG. 25 shows the correspondence between the physical sector numbers and the LSNs after the slipping replacement algorithm described with reference to FIG. 24 is executed. The horizontal axis represents the physical sector number, and the vertical axis represents the LSN. In FIG. 25, chain line 2501 indicates the correspondence between the physical sector numbers and the LSNs when the user area 6 includes no defective sector. Solid line 2502 indicates the correspondence between the physical sector numbers and the LSNs when the user area 6 includes defective sectors I through IV.

As shown in FIG. 25, no LSN is assigned to the defective sectors I through IV. The assignment of the LSNs is slipped in the direction toward an outer portion from an inner portion of the optical disk (i.e., in the increasing direction of the physical sector number). As a result, the LSNs are assigned to a part of the sectors in the spare area 8 which is located immediately after the user area 6.

An advantage of the slipping replacement algorithm is that a delay in access caused by a defective sector is relatively small. One defective sector delays the access merely by a part of the rotation corresponding to one sector. A disadvantage of the slipping replacement algorithm is that the assignment of all the LSNs is slipped after one defective sector. An upper level apparatus such as, for example, a host personal computer identifies sectors by LSNs assigned thereto. When the assignment of the LSNs to the sectors is slipped, the host computer cannot manage user data recorded in the optical disk. Accordingly, the slipping replacement algorithm is not usable after the user data is recorded in the optical disk.

FIG. 26 is a conceptual view of the conventional linear replacement algorithm. In FIG. 26, each of the rectangle boxes represents a sector. Characters in each sector represent a logical sector number (LSN) assigned to the sector. The rectangle boxes having an LSN represent normal sectors, and the hatched rectangle box represents a defective sector.

Reference numeral 2601 represents a sequence of sectors including no defective sector in the user area 6, and reference numeral 2602 represents a sequence of sectors including one defective sector in the user area 6.

If a sector in the sequence of sectors 2601 to which LSN:i is assigned was a defective sector, the assignment of the LSNs is changed so that LSN:i is not assigned to the defective sector. Instead, LSN:i is assigned to, among a plurality of sectors included in the spare area 8, a sector which is unused yet and has a minimum physical sector number (e.g., a first sector of the spare area 8) as represented by the sequence of sectors 2602. Thus, the defective sector in the user area 6 is replaced with a sector in the spare area 8.

FIG. 27 shows the correspondence between the physical sector numbers and the LSNs after the linear replacement algorithm described with reference to FIG. 26 is executed. The horizontal axis represents the physical sector number, and the vertical axis represents the LSN. In FIG. 27, the solid line 2701 indicates the correspondence between the physical sector numbers and the LSNs when the user area 6 includes two defective sectors. The two defective sectors in the user area 6 are replaced by replacing sectors in the spare area 8, respectively.

An advantage of the linear replacement algorithm is that replacement of a defective sector does not influence other sectors since defective sectors and replacing sectors correspond to each other one to one. A disadvantage of the linear replacement algorithm is that a delay in access caused by a defective sector is relatively large. Accessing a replacing sector instead of a defective sector requires a seek operation over a relatively long distance.

As can be appreciated, the advantage and disadvantage of the linear replacement algorithm are converse to the advantage and disadvantage of the slipping replacement algorithm.

FIG. 28 shows an example of assignment of the LSNs to the sectors. In the example shown in FIG. 28, it is assumed that the user area 6 has a size of 100000, the spare area 8 has a size of 10000, and the user area 6 includes four defective sectors.

LSNs are assigned to the sectors in accordance with the slipping replacement algorithm described above.

First, LSN:0, which is a first LSN, is assigned to a sector having a physical sector number:0. Then, LSNs are assigned to the sectors in an increasing order toward an outer portion from an inner portion of the optical disk (i.e., toward the spare area 8 from the user area 6). No LSN is assigned to the defective sectors. The LSN which would be assigned to each defective sector is assigned to a sector immediately subsequent thereto. As a result, the assignment of the LSNs is slipped in the direction toward an outer portion from an inner portion of the optical disk by the number of the defective sectors.

In the example shown in FIG. 28, the user area 6 includes four defective sectors I through IV as described above. LSN:99996 through LSN:99999, which would be assigned to the four sectors I through IV if the four sectors I through IV were not defective, are assigned to four sectors in the spare area 8, respectively, having physical sector numbers of 100000 through 100003. The reason for this is that the assignment of the LSNs is slipped by the number of the defective sectors (four in this example).

In FIG. 28, the sectors in the spare area 8 having the physical sector numbers of 100004 through 109999 are collectively referred to as an"LR spare area". The LR spare area is defined as an area in the spare area 8 to which no LSN is assigned. The LR spare area is used in the linear replacement algorithm as a replacing area.

As shown in FIG. 27, the conventional linear replacement algorithm has a problem in that, when a sector having a small physical sector number is defected as a defective sector, a delay in access caused by the defective sector is relatively large since the distance between the defective sector and the replacing sector is relatively long. Since the file management area 10 located in the vicinity of the sector to which LSN:0 is assigned is accessed each time a file is recorded, a defective sector in the file management area 10 may directly cause undesirable reduction in the access speed to the optical disk. The file management area 10, which is frequently accessed, is expected to have the highest possibility of generating a defective sector.

In order to find the first address of the replacing area (i.e., LR spare area) used in the linear replacement algorithm, the number of sectors by which the assignment of the LSNs is slipped in the slipping replacement algorithm needs to be calculated. The amount of calculation increases as the disk capacity increases.

SUMMARY OF THE INVENTION

According to one aspect of the invention, an information recording medium includes a disk information area; a user area including a plurality of sectors; and a spare area including at least one sector which, when at least one of the plurality of sectors included in the user area is a defective sector, is usable instead of the at least one defective sector. The spare area is located radially inward from the user area. A physical sector number of a sector to which a logical sector number "0" is assigned, among the plurality of sectors included in the user area and the at least one sector included in the spare area, is recorded in the disk information area.

In one embodiment of the invention, a logical sector number is assigned to the sectors included in the user area other than the at least one defective sector in a decreasing order from the sector to which a last logical sector number is assigned.

In one embodiment of the invention, a physical sector number of the at least one defective sector is recorded in the disk information area.

In one embodiment of the invention, the combined user area and spare area is divided into a plurality of zones, and a logical sector number assigned to a first sector of each of the plurality of zones is recorded in the disk information area.

In one embodiment of the invention, the combined user area and spare area is divided into a plurality of zones. Data recorded in the information recording medium is managed on an ECC block-by-ECC block basis. A logical sector number is assigned to the sectors included in the user area other than the at least one defective sector so that a first sector of each of the plurality of zones matches a first sector of a corresponding ECC block.

According to another aspect of the invention, a method for managing a defect of an information recording medium including a disk information area; a user area including a plurality of sectors; and a spare area including at least one sector which, when at least one of the plurality of sectors included in the user area is a defective sector, is usable instead of the at least one defective sector, the spare area being located radially inward from the user area. The method includes the steps of (a) assigning a last logical sector number to one of the plurality of sectors included in the user area; (b) calculating a location fulfilling a prescribed capacity, with a location of the sector to which the last logical sector number is assigned being fixed; (c) assigning a logical sector number "0" to a sector positioned at the location calculated by the step (b); and (d) recording a physical sector number of the sector to which the logical sector number "0" is assigned in the disk information area.

In one embodiment of the invention, the step (b) includes the steps of (b-1) detecting the at least one defective sector included in the user area; and (b-2) calculating the location fulfilling the prescribed capacity based on the number of the at least one defective sector detected in the step (b-1).

In one embodiment of the invention, the method further includes the step of (e) recording the at least one defective sector detected in the step (b-1) in the information recording medium.

In one embodiment of the invention, the combined user area and spare area is divided into a plurality of zones, and the method further includes the step of (f) recording a logical sector number assigned to a first sector of each of the plurality of zones in the disk information area.

In one embodiment of the invention, the combined user area and spare area is divided into a plurality of zones. Data recorded in the information recording medium is managed on an ECC block-by-ECC block basis. The method further includes the step of (g) assigning a logical sector number to the sectors included in the user area other than the at least one defective sector so that a first sector of each of the plurality of zones matches a first sector of a corresponding ECC block.

According to still another aspect of the invention, an apparatus for managing a defect of an information recording medium including a disk information area; a user area including a plurality of sectors; and a spare area including at least one sector which, when at least one of the plurality of sectors included in the user area is a defective sector, is usable instead of the at least one defective sector, the spare area being located radially inward from the user area. The apparatus executes defect management processing, which comprises the steps of (a) assigning a last logical sector number to one of the plurality of sectors included in the user area; (b) calculating a location fulfilling a prescribed capacity, with a location of the sector to which the last logical sector number is assigned being fixed; (c) assigning a logical sector number "0" to a sector positioned at the location obtained by the step (b); and (d) recording a physical sector number of the sector to which the logical sector number "0" is assigned in the disk information area.

In one embodiment of the invention, the step (b) includes the steps of (b-1) detecting the at least one defective sector included in the user area; and (b-2) calculating the location fulfilling the prescribed capacity based on the number of the at least one defective sector detected in the step (b-1).

In one embodiment of the invention, the defect management processing further includes the step of (e) recording the at least one defective sector detected in the step (b-1) in the information recording medium.

In one embodiment of the invention, the combined user area and spare area is divided into a plurality of zones. The defect management processing further includes the step of (f) recording a logical sector number assigned to a first sector of each of the plurality of zones in the disk information area.

In one embodiment of the invention, wherein the combined user area and spare area is divided into a plurality of zones, data recorded in the information recording medium is managed on an ECC block-by-ECC block basis, and the defect management processing further includes the step of (g) assigning a logical sector number to the sectors included in the user area other than the at least one defective sector so that a first sector of each of the plurality of zones matches a first sector of a corresponding ECC block.

Thus, the invention described herein makes possible the advantages of providing (1) an information recording medium and a method and an apparatus for managing a defect thereof for keeping a delay in access relatively small even when a defective sector is detected in a file management area located in the vicinity of a sector to which LSN:0 is assigned; and (2) an information recording medium, and a method and an apparatus for managing a defect thereof for allowing the location of an LR spare area to be found with substantially no calculation.

These and other advantages of the present invention will become apparent to those skilled in the art upon reading and understanding the following detailed description with reference to the accompanying figures.

BRIEF DESCRIPTION OF THE DRAWINGS

FIG. 6A is a diagram showing a structure of a PDL;

FIG. 6B is a diagram showing a structure of an SDL;

FIG. 7 is a conceptual view of a slipping replacement algorithm according to the present invention;

DESCRIPTION OF THE EMBODIMENTS

Hereinafter, the present invention will be described by way of illustrative examples with reference to the accompanying drawings.

EXAMPLE 1

1. Structure of an Information Processing System

Figure 1:
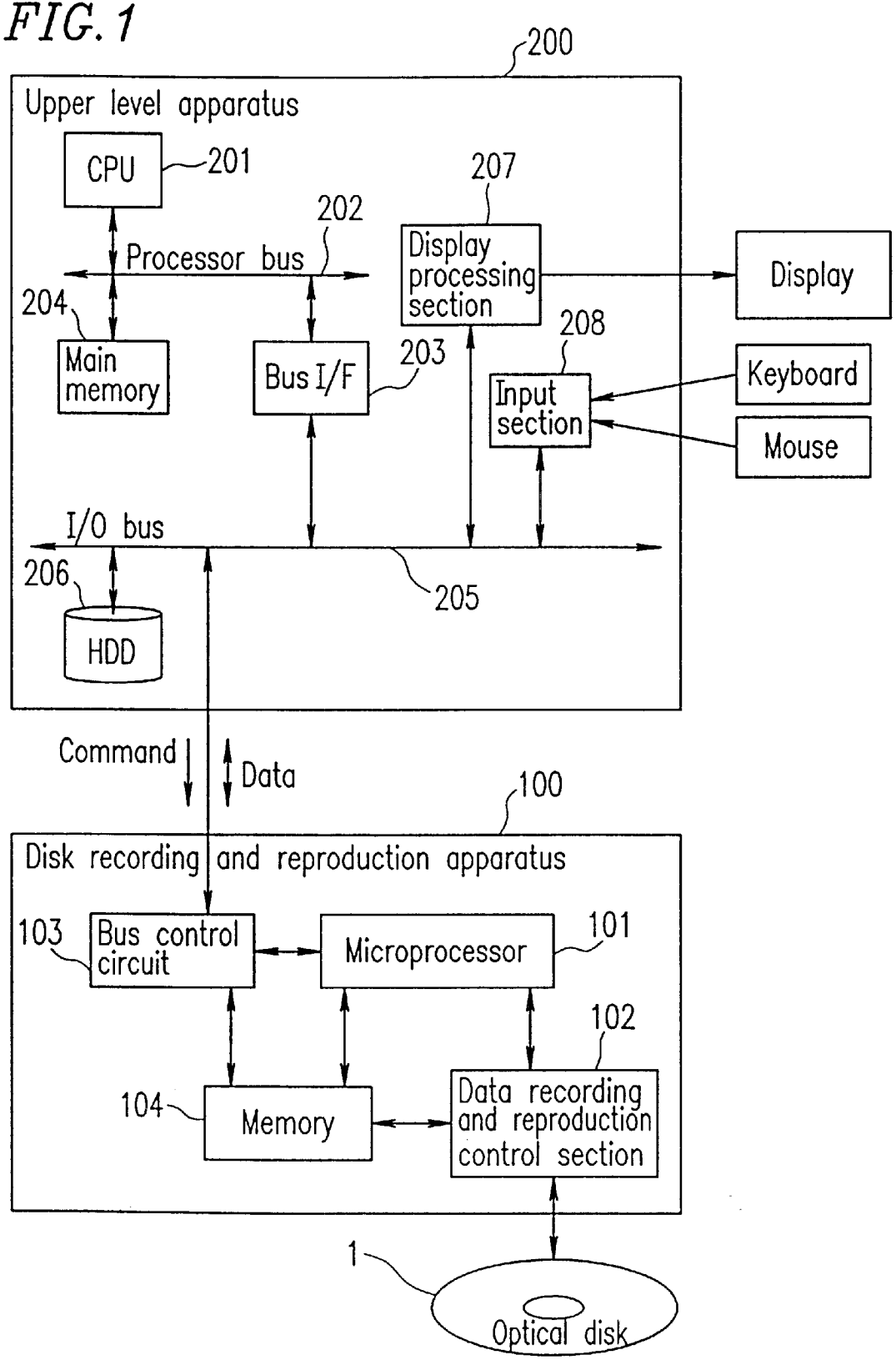
FIG. 1 a block diagram showing a structure of an information processing system in an example according to the present invention.

FIG. 1 shows a structure of an information processing system in a first example according to the present invention. The information processing system includes an upper level apparatus 200 and a disk recording and reproduction apparatus 100. The disk recording and reproduction apparatus 100 records information to a rewritable optical disk 1 or reproduces information recorded in the optical disk 1 in accordance with a command from the upper level apparatus 200. The upper level apparatus 200 is, for example, a personal computer.

The upper level apparatus 200 includes a CPU 201, a main memory 204, a bus interface (bus I/F) 203, a processor bus 202, an I/O bus 205, a hard disk device (HDD) 206, a display processing section 207, and an input section 208. The upper level apparatus 200 is connected to the disk recording and reproduction apparatus 100 through the I/O bus 205.

The processor bus 202 is a high speed bus through which the CPU 201 accesses the main memory 204. The processor bus 202 is connected to the I/O bus 205 through the bus I/F 203.

In the example shown in FIG. 1, the I/O bus 205 is a personal computer extended bus such as, for example, a PCI bus or an ISA bus. The I/O bus 205 can be an arbitrary multi-purpose bus of, for example, SCSI (Small Computer System Interface), ATA (At Attachment), USB (Universal Serial Bus), or IEEE1394.

The display processing section 207 converts display information sent through the I/O bus 205 into a signal such as, for example, an RGB signal, and outputs the resultant signal.

The input section 208 receives data from an input device such as, for example, a keyboard or a mouse and sends the data to the CPU 201 through the I/O bus 205.

The HDD 206 is a secondary memory device for inputting and outputting data with the main memory 204 through the I/O bus 205. The HDD 206 has an operating system such as, for example, MS-DOS® or Windows® and a program file stored therein. The main memory 204 is loaded with the operating system and the program file, and the operating system and the program file are operated by the CPU 201 in accordance with an instruction from the user. The operation results are displayed on a screen by the display processing section 207.

The disk recording and reproduction apparatus 100 includes a microprocessor 101, a data recording and reproduction control section 102, a bus control circuit 103 and a memory 104.

The microprocessor 101 controls the elements in the disk recording and reproduction apparatus 100 in accordance with a control program built in the microprocessor 101 to execute various types of processing. Defect management processing and replacement processing described below are executed by the microprocessor 101.

The data recording and reproduction control section 102 controls recording of data to and reproduction of data from the optical disk 1 in accordance with an instruction from the microprocessor 101. The data recording and reproduction control section 102 adds an error correction code to the data during recording, and executes error detection processing and error correction processing during reproduction. In general, data coded by encoding processing such as, for example, CRC or ECC is recorded in the optical disk 1.

The bus control circuit 103 receives a command from the upper level apparatus 200 through the I/O bus 205, and transmits and receives data with the upper level apparatus 200 through the I/O bus 205.

The memory 104 is used for storing data during various types of processing executed by the disk recording and reproduction apparatus 100. For example, the memory 104 has an area used as an intermediate buffer during data recording or reproduction and an area used by the data recording and reproduction control section 102 for the error correction processing.

The optical disk 1 is a circular information recording medium to which data can be recorded and from which data can be reproduced. Usable as the optical disk 1 is an arbitrary information recording medium such as, for example, a DVD-RAM disk. Data recording and reproduction is performed on a sector-by-sector basis or on a block-by-block basis.

2. Physical Structure of the Optical Disk 1

Figure 2:
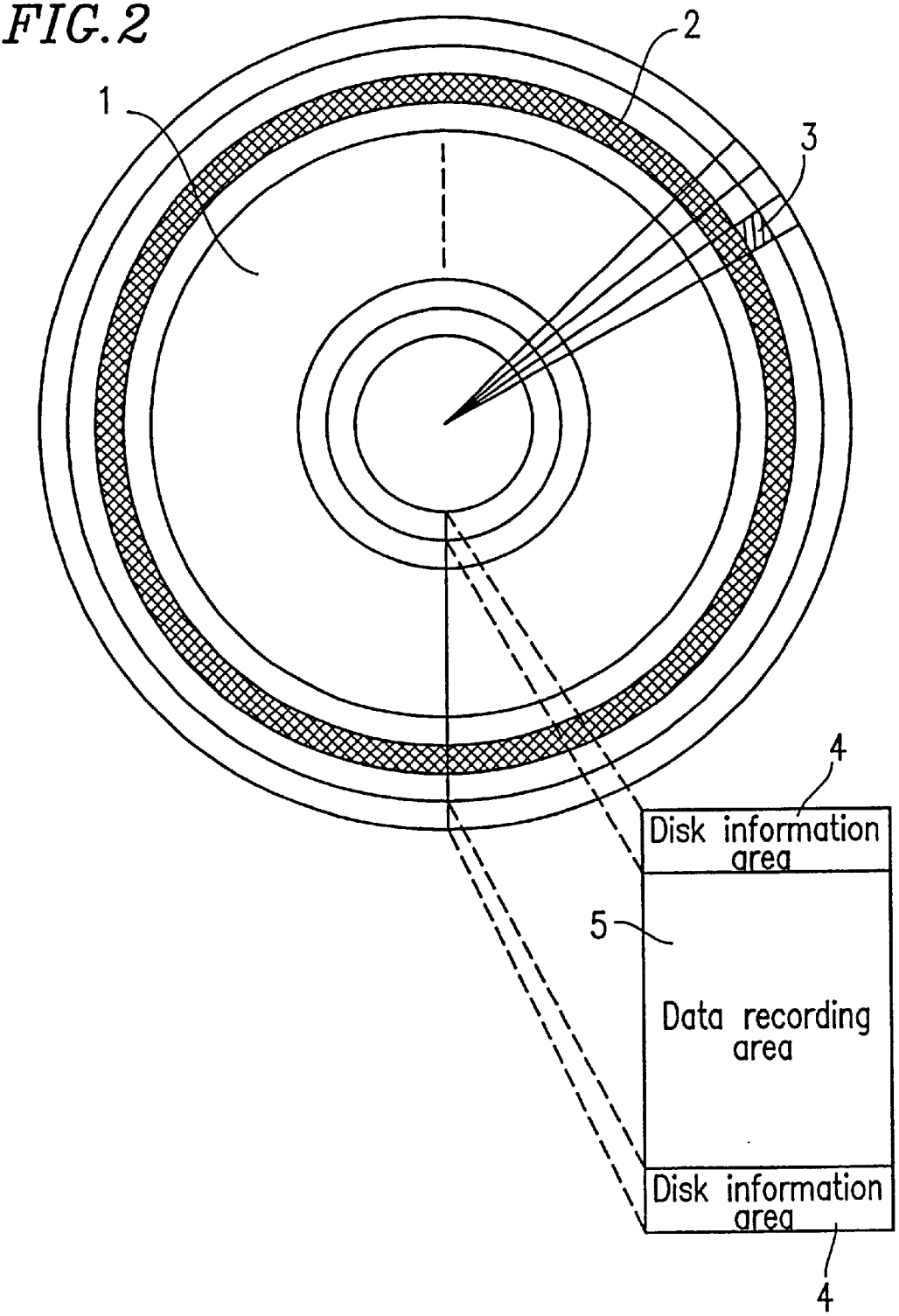
FIG. 2 is a diagram showing a physical structure of an optical disk 1.

FIG. 2 shows a physical structure of the optical disk 1. The circular optical disk 1 has a plurality of concentric tracks or a spiral track 2 formed therein. Each of the tracks or track 2 is divided into a plurality of sectors 3. The optical disk 1 includes at least one disk information area 4 and a data recording area 5.

The disk information area 4 has, for example, a parameter required for accessing the optical disk 1. In the example shown in FIG. 2, the optical disk 1 has one disk information area 4 in an innermost part and one disk information area 4 in an outermost part thereof. The disk information area 4 in the innermost part is also referred to as a "lead-in area". The disk information area 4 in the outermost part is also referred to as a "lead-out area".

The data recording area 5 has data recorded therein. Data is recorded to and reproduced from the data recording area 5. Each of all sectors in the data recording area 5 has an absolute address referred to as a physical sector number pre-assigned thereto.

3. Logical Structure of the Optical Disk 1

Figure 3:
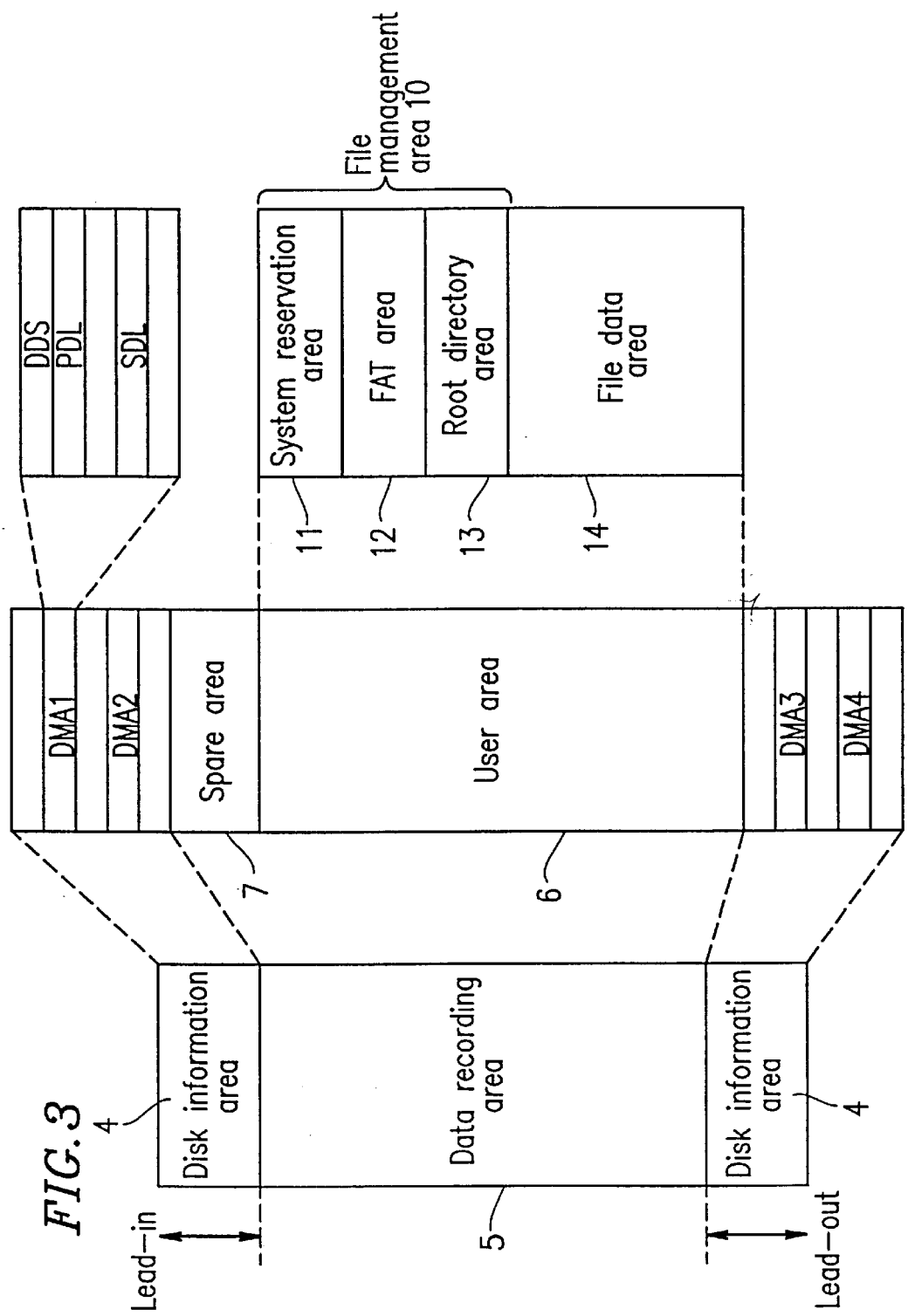
FIG. 3 is a diagram showing a logical structure of the optical disk 1.

FIG. 3 shows a logical structure of the optical disk 1. The data recording area 5 includes a user area 6 and a spare area 7.

The user area 6 is prepared for storing user data. Usually, the user data is stored in the user area 6. Each of sectors included in the user area 6 has a logical sector number (LSN) assigned thereto, by which the sector is accessed. The upper level apparatus 200 shown in FIG. 1 accesses a sector in the optical disk 1 using the LSN to perform recording and reproduction of data.

The spare area 7 includes at least one sector which, when a sector in the user area 6 becomes defective, can be used in place of the defective sector. A sector in the user area 6 becomes defective by, for example, scratches, stains or quality decline of the user area 6 of the optical disk 1. The spare area 7 is located radially inward from the user area 6. Preferably, the spare area 7 is located immediately radially inward from the user area 6.

The user area 6 includes a system reservation area 11, a FAT (File Allocation Table) area 12, a root directory area 13, and a file data area 14. Such a structure is in conformity to an MS-DOS file system. The structure shown in FIG. 3 is merely an example.

The system reservation area 11 has parameter information and volume information of the optical disk 1 stored therein as a boot sector. Such information can be referred to by the upper level apparatus 200.

In order for the upper level apparatus 200 to access the optical disk 1, the upper level apparatus 200 needs to access the system reservation area 11 with certainty. A logical sector number "0" (LSN:0) is assigned to a first sector of the system reservation area 11. Sizes and locations of entries in the system reservation area 11 are predetermined.

The FAT area 12 has stored therein location information indicating locations of files and directories in the file data area 14 and a FAT indicating locations of empty areas.

The root directory area 13 has entry information on files and sub-directories stored therein. The entry information includes, for example, a file name, directory name, file attribute and updating date information.

The system reservation area 11, FAT area 12, and root directory area 13 are collectively referred to as a file management area 10. The file management area 10 is positioned at a location on the optical disk 1 corresponding to a fixed LSN.

The file data area 14 has stored therein data which represents a directory associated with the root directory and data which represents a file. As described above, in order that the upper level apparatus 200 may access data stored in the file data area 14, the upper level apparatus 200 needs to access the file management area 10 before accessing the file data area 14.

4. Method for Managing a Defect of the Optical Disk 1

In order to manage a defective sector in the optical disk 1, a PDL (Primary Defect List) and an SDL (Secondary Defect List) are used.

When initializing the optical disk 1, a defective sector is detected in accordance with the slipping replacement algorithm. The detected defective sector is registered in the PDL. When recording data to the optical disk 1, a defective sector is detected in accordance with the linear replacement algorithm. The detected defective sector is registered in the SDL. The reliability of the optical disk 1 is guaranteed by registering the defective sector in the PDL or SDL.

The PDL and SDL are stored in a DMA (Defect Management Area). A DDS (Disk Definition Structure) is also stored in the DMA.

4.1. Structure of the DMA

Figure 4:
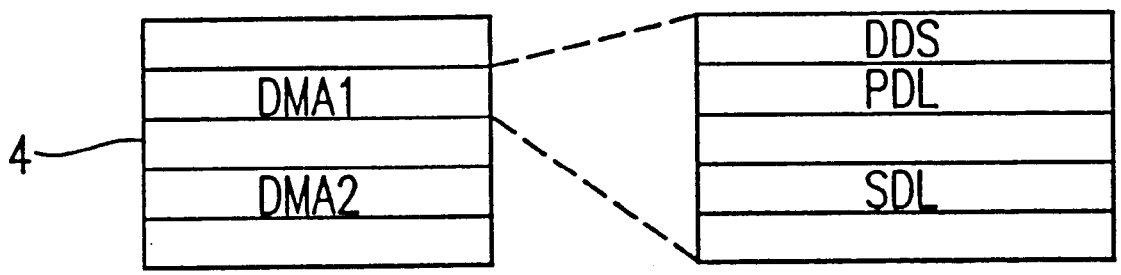
FIG. 4 is a diagram showing a structure of a DMA.

FIG. 4 shows a structure of the DMA. The DMA is a part of the disk information area 4 shown in FIGS. 2 and 3.

The DMA is described as DMA1 through DMA4 in Chapter 18 of ISO standards regarding the layout in an optical disk. Two out of four DMAs (e.g., DMA1 and DMA2) are located in the disk information area 4 arranged at the inner portion of the optical disk, and the remaining two DMAs (e.g., DMA3 and DMA4) are located in the disk information area 4 arranged at the outer portion of the optical disk 1 (FIG. 3). In the four DMAs, identical information is multiplex-recorded in order to compensate for a defective sector in a DMA which cannot be replaced with a replacing sector.

FIG. 4 shows an example of the disk information area 4 arranged at the inner portion of the optical disk 1, which includes DMA1 and DMA2 among the four DMAs.

The DMA1 has a DDS, a PDL and an SDL stored therein. DMA2 through DMA4 have an identical structure with that of DMA1.

Figure 5:
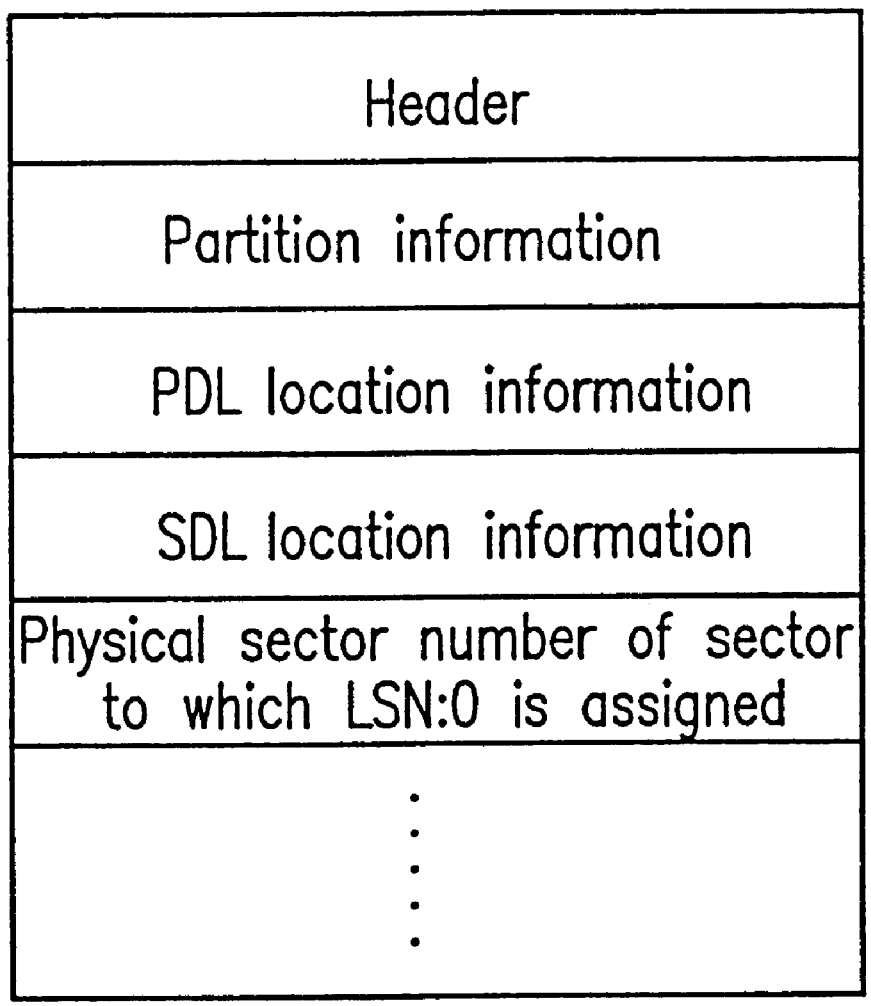
FIG. 5 is a diagram showing a structure of a DDS.

4.1.1 Structure of the DDS FIG. 5 Shows a Structure of the DDS.

The DDS includes a header. The header includes, for example, an identifier indicating the information is the DDS. The DDS further includes an entry for storing partition information, an entry for storing PDL location information, an entry for storing SDL location information, and an entry for storing a physical sector number of a sector to which the logical sector number "0" (LSN:0) is assigned to.

4.1.2 Structure of the PDL FIG. 6A Shows a Structure of the PDL.

The PDL includes a header and a plurality of entries (first through m'th entries in the example shown in FIG. 6A). The header includes, for example, an identifier indicating the information is the PDL and the number of entries of defective sectors registered in the PDL. Each entry stores a physical sector number of the defective sector.

4.1.3. Structure of the SDL FIG. 6B Shows a Structure of the SDL.

The SDL includes a header and a plurality of entries (first through n'th entries in the example shown in FIG. 6B). The header includes, for example, an identifier indicating the information is the SDL and the number of entries of defective sectors registered in the SDL. Each entry includes a physical sector number of the defective sector and the physical sector number of the replacing sector in which data is recorded instead of the defective sector. The SDL is different from the PDL in having the physical sector number of the replacing sector.

4.2 Slipping Replacement Algorithm

FIG. 7 is a conceptual view of a slipping replacement algorithm executed by the disk recording and reproduction apparatus 100 (FIG. 1) in the first example according to the present invention. In FIG. 7, each of the rectangle boxes represents a sector. Characters in each sector represent an LSN assigned to the sector. The rectangle boxes having an LSN represent normal sectors, and the hatched rectangle box represents a defective sector.

Reference numeral 71 represents a sequence of sectors including no defective sector registered in the PDL, and reference numeral 72 represents a sequence of sectors including one defective sector registered in the PDL.

When a last sector in the user area 6 is a normal sector, LSN:m is assigned to the last sector. LSNs are assigned to a plurality of sectors included in the user area 6 in a decreasing order from the last sector to which LSN:m is assigned.

When the PDL includes no defective sector, LSN:m through LSN:0 are assigned to the sectors in the user area 6 sequentially from the last sector to a first sector thereof as represented by the sequence of sectors 71.

If a sector in the sequence of sectors 71 to which LSN:i is assigned was a defective sector, the assignment of the LSNs is changed so that LSN:i is not assigned to the defective sector but to a sector immediately before the defective sector. Thus, the assignment of the LSNs is slipped by one sector in the direction toward the spare area 7 from the user area 6. As a result, the last sector LSN:0 is assigned to a last sector of the spare area 7 as represented by the sequence of sectors 72.

Figure 8:
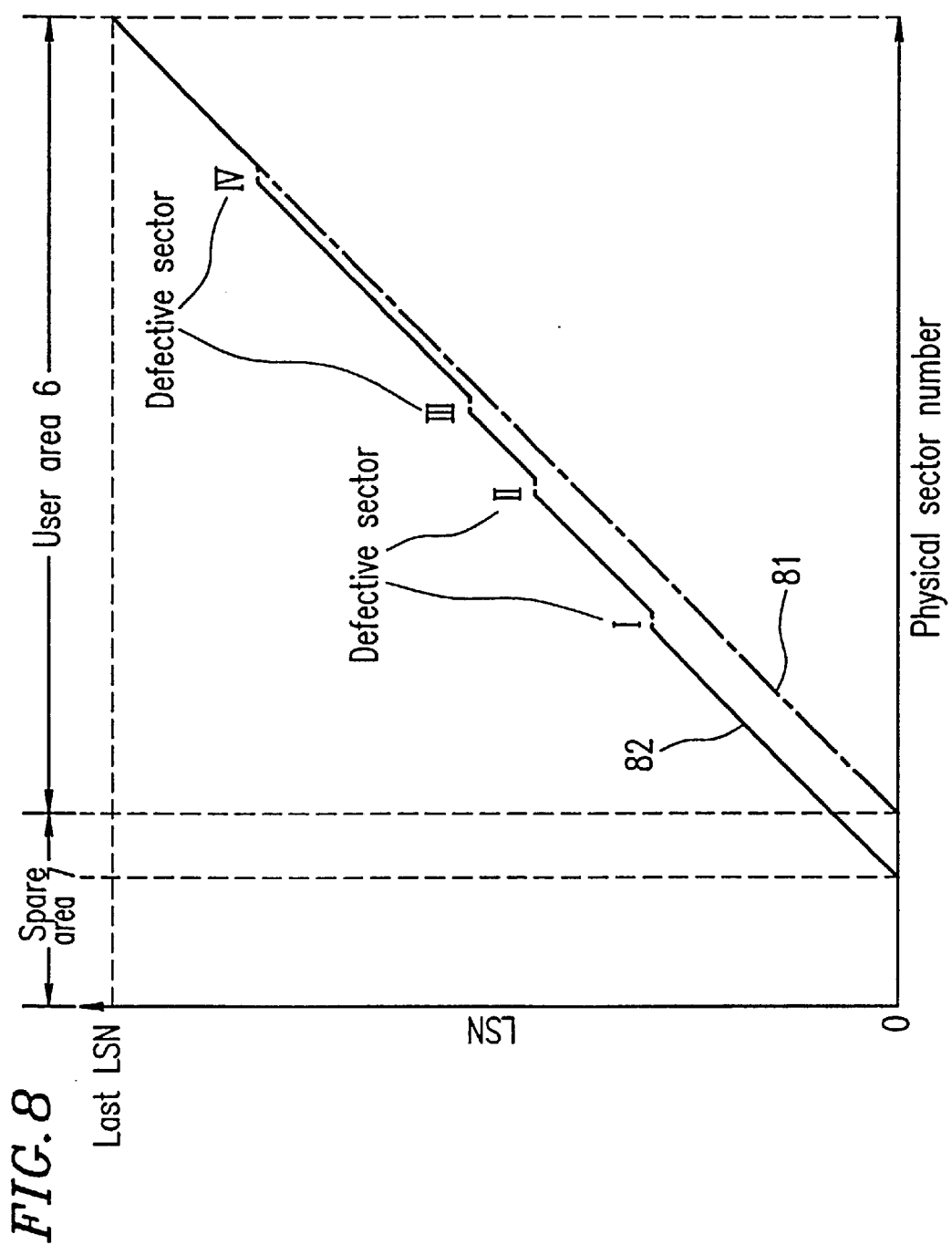
FIG. 8 is a graph illustrating the correspondence between physical sector numbers and LSNs after the slipping replacement algorithm shown in FIG. 7 is executed.

FIG. 8 shows the correspondence between the physical sector numbers and the LSNs after the slipping replacement algorithm described with reference to FIG. 7 is executed. The horizontal axis represents the physical sector number, and the vertical axis represents the LSN. In FIG. 8, chain line 81 indicates the correspondence between the physical sector numbers and the LSNs when the user area 6 includes no defective sector. Solid line 82 indicates the correspondence between the physical sector numbers and the LSNs when the user area 6 includes defective sectors I through IV.

As shown in FIG. 8, no LSN is assigned to the defective sectors I through IV. The assignment of the LSNs are slipped in the direction toward an inner portion from an outer portion (i.e., in the decreasing direction of the physical sector number). As a result, an LSN is assigned to a part of the spare area 7 located immediately radially inward from the user area 6.

As described above, when one or more defective sectors are registered in the PDL, the assignment of the LSNs is slipped in the direction toward an inner portion from an outer portion of the optical disk 1, with the location of the sector to which the last LSN is assigned being fixed. As a result, LSNs are assigned to one or more sectors in the spare area 7 located radially inward from the user area 6 of the optical disk 1. The number of the sectors in the spare area 7 to which the LSNs are assigned equals the number of the defective sectors in the user area 6.

The location of a sector to which the LSN:0 is to be assigned is calculated so as to fulfill a prescribed capacity (e.g., 4.7 GB), with the location of the sector to which the last LSN is assigned being fixed. The calculation is performed based on the number of the defective sectors detected in the user area 6. LSN:0 is assigned to the sector positioned at the calculated location. The prescribed capacity is the capacity which is required to be secured as an area in which user data can be recorded. As described above, when the user area 6 includes one or more defective sectors, a prescribed capacity (e.g., 4.7 GB) can always be secured by using a part of the spare area 7 instead of the user area 6.

When the last sector of the user area 6 is a normal sector, the last LSN is assigned to the last sector of the user area 6. When the last sector of the user area 6 is a defective sector, the last LSN is assigned to a normal sector closest to the last sector.

The physical sector number of the sector to which LSN:0 is assigned is stored in an entry in the DDS (FIG. 5). The entry is referred to by the upper level apparatus 200 for recording data in the optical disk 1. By referring to the entry, the upper level apparatus 200 can obtain the physical sector number corresponding to LSN:0 without performing a calculation. As a result, a high speed access to the sector-having LSN:0 assigned thereto is realized.

For recording data in the optical disk 1, the upper level apparatus 200 needs to access the sector having LSN:0 assigned thereto, with certainty. Accordingly, the capability of accessing the sector to which LSN: 0 is assigned at a high speed is very effective in accessing the optical disk 1 at a high speed.

4.3 Linear Replacement Algorithm

Figure 9:
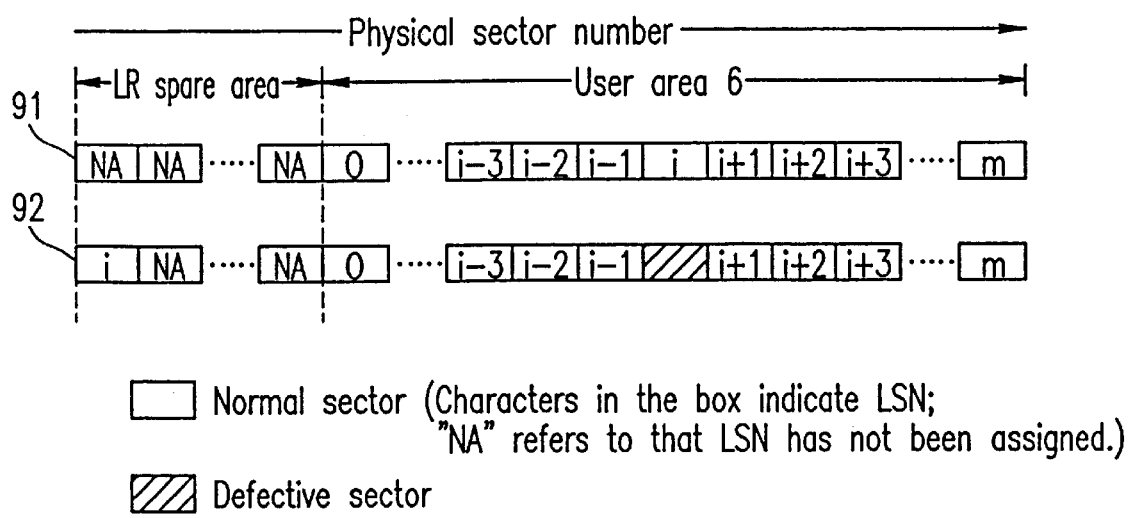
FIG. 9 is a conceptual view of a linear replacement algorithm according to the present invention.

FIG. 9 is a conceptual view of a linear replacement algorithm executed by the disk recording and reproduction apparatus 100 (FIG. 1). In FIG. 9, the rectangle boxes each represent a sector. Characters in each sector represent an LSN assigned to the sector. The rectangle boxes having an LSN represent normal sectors, and the hatched rectangle box represents a defective sector.

Reference numeral 91 represents a sequence of sectors including no defective sector in the SDL, and reference numeral 92 represents a sequence of sectors including one defective sector in the SDL.

If a sector in the sequence of sectors 91 to which LSN:i is assigned was a defective sector, the assignment of the LSNs is changed so that LSN:i is not assigned to the defective sector. Instead, LSN:i is assigned to a sector which is unused yet and has a minimum physical sector number (e.g., a first sector of the LR spare area; described later with reference to FIG. 14) as represented by the sequence of sectors 92. Thus, the defective sector in the user area 6 is replaced with a sector in the LR spare area.

LSN:i can be assigned to, among the plurality of sectors included in the LR spare area, a sector which has not been used yet and has a maximum physical sector number (e.g., a sector having a physical sector number which is less by 1 than the physical sector number of the sector to which LSN:0 is assigned). It is not important in which order the sectors in the LR spare area are used.

Figure 10:
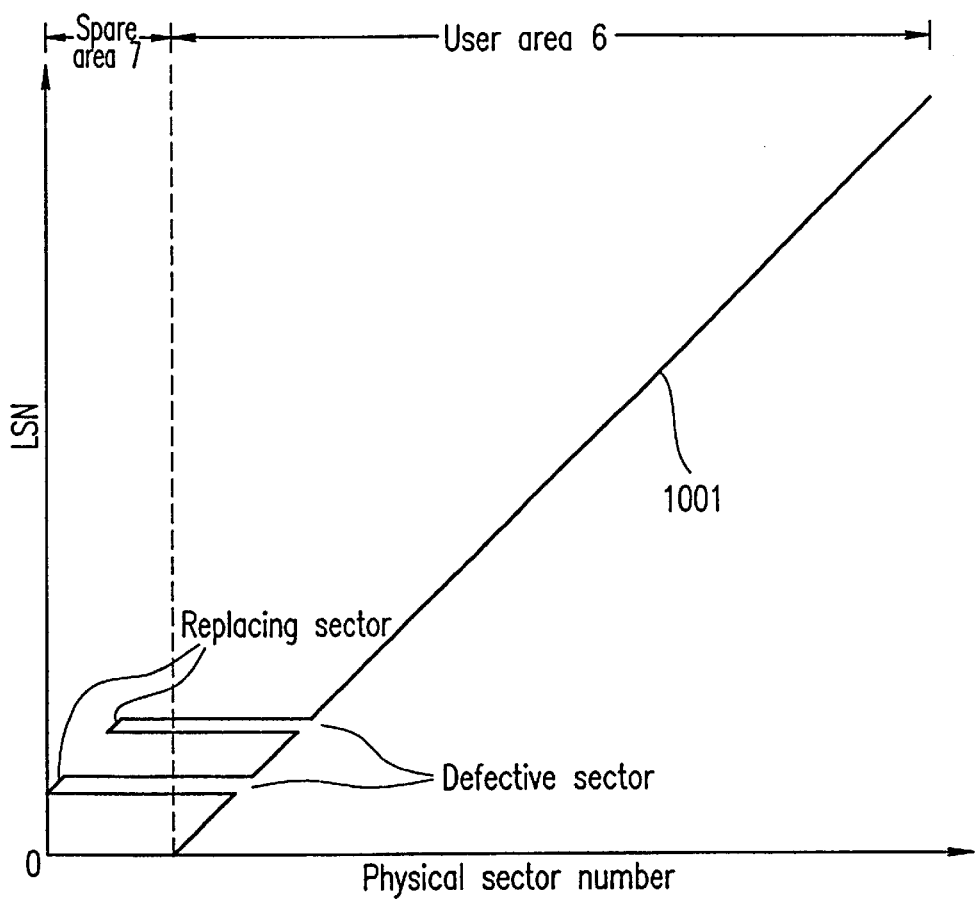
FIG. 10 is a graph illustrating the correspondence between physical sector numbers and LSNs after the linear replacement algorithm shown in FIG. 7 is executed.

FIG. 10 shows the correspondence between the physical sector numbers and the LSNs after the linear replacement algorithm described with reference to FIG. 9 is executed. The horizontal axis represents the physical sector number, and the vertical axis represents the LSN. In FIG. 10, solid line 1001 indicates the correspondence between the physical sector numbers and the LSNs when the user area 6 includes two defective sectors.

Figure 27:
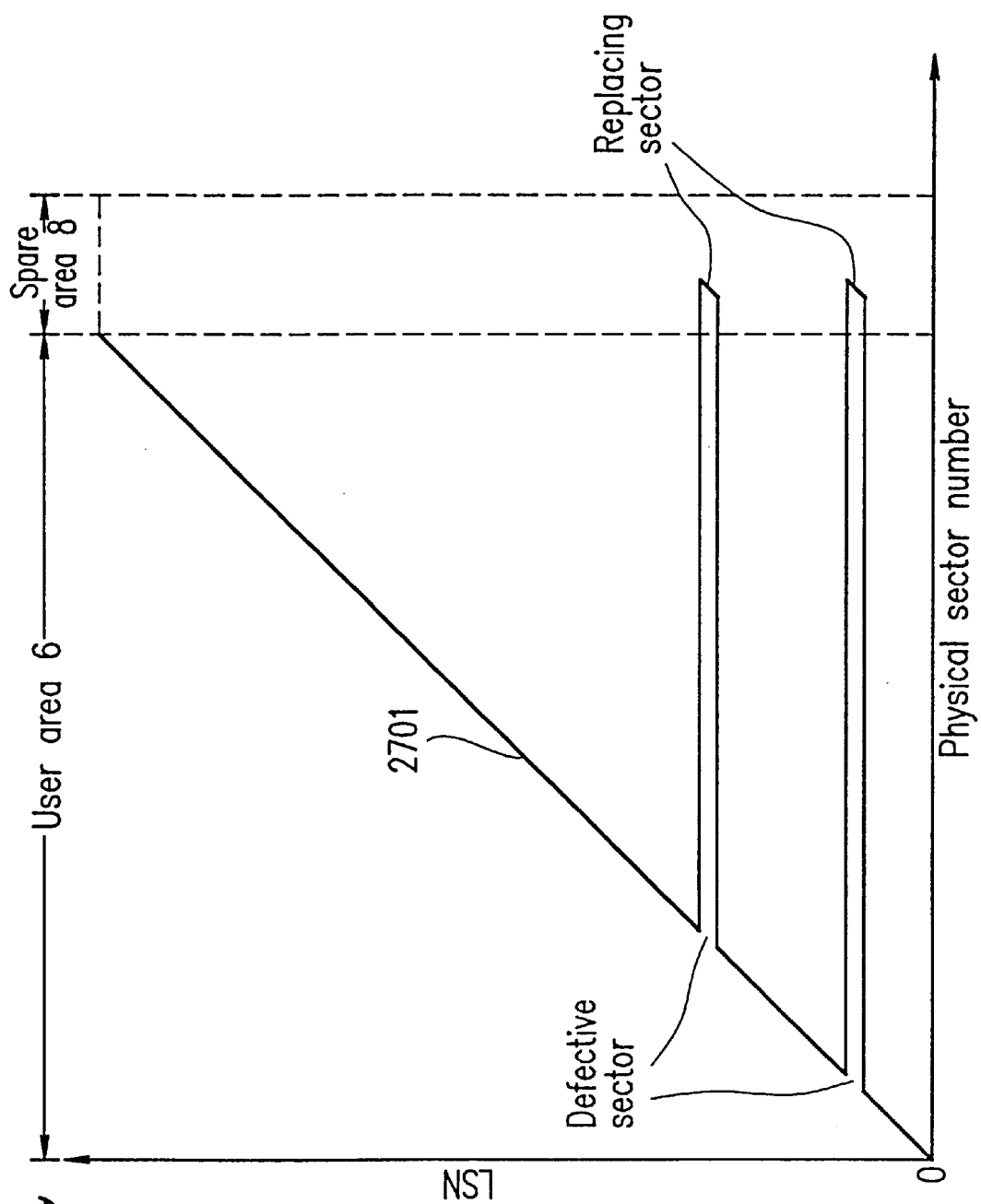
FIG. 27 is a graph illustrating the correspondence between physical sector numbers and LSNs of the conventional optical disk after the conventional linear replacement algorithm is executed.
Figure 28:
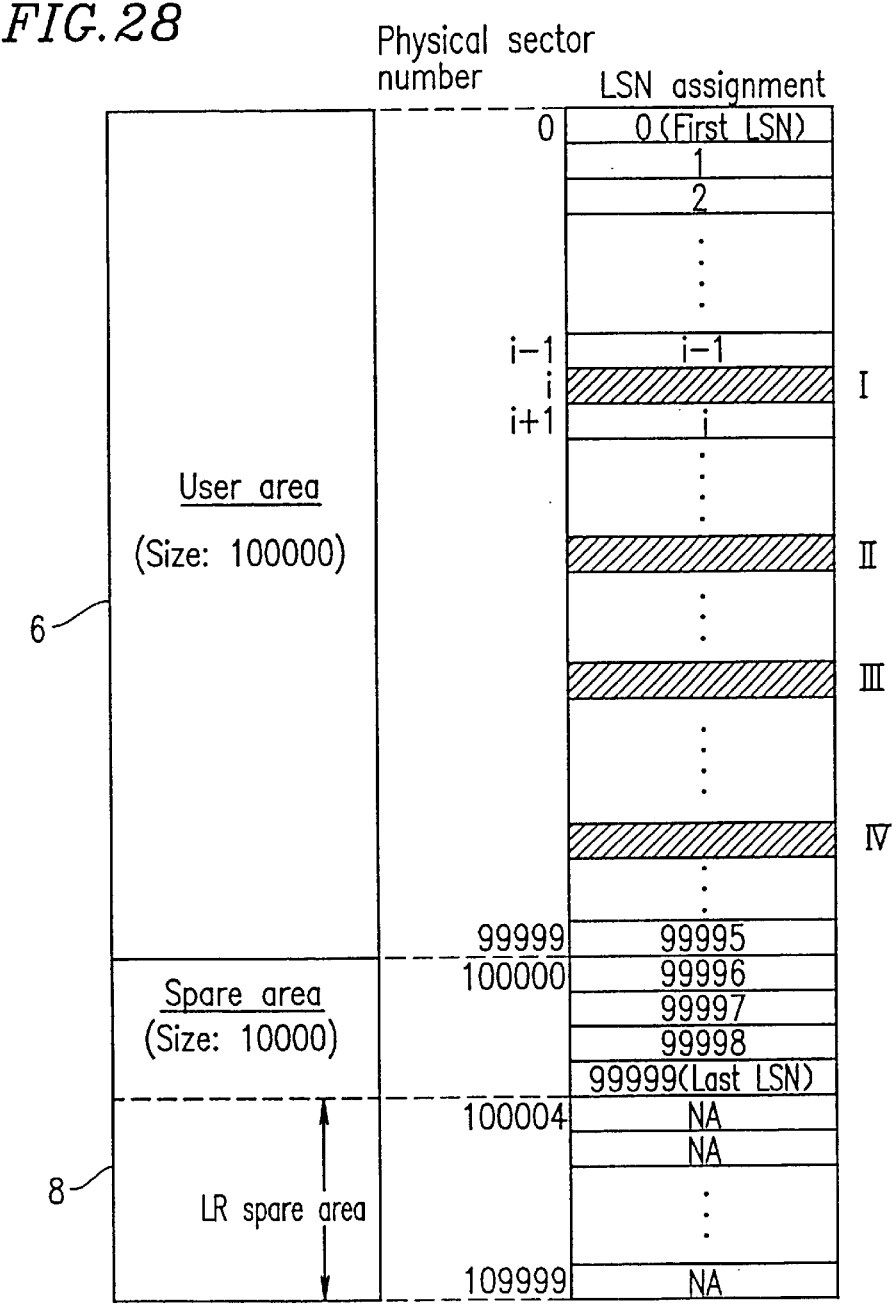
FIG. 28 is a diagram showing an example of LSNs assigned to the sectors of the conventional optical disk.

It can be appreciated from FIG. 10 that the distance between the defective sector and the replacing sector (number of physical sectors) is significantly reduced compared to that in the conventional art (FIG. 27).

5. Operations of the Disk Recording and Reproduction Apparatus 100

The disk recording and reproduction apparatus 100 performs the operations of 5.1 through 5.3 as initialization of the optical disk 1. The examination of the disk (5.1) is also referred to as the physical formatting and usually performed once on one optical disk 1.

5.1: Examination of the Disk
5.2: LSN Assignment
5.3: Recording of Initial Data in the File System After performing the initialization, the disk recording and reproduction apparatus 100 performs the operations of 5.4 and 5.5 each time a file is written or read.

5.4 Recording of Data (Recording of the File System and the File Data)
5.5 Reproduction of the Data Hereinafter, the above-mentioned operations will be described in detail.

5.1 Examination of the Disk

Examination of the disk is performed at least once before recording data in the optical disk 1 in order to guarantee the quality of the optical disk 1. When the number of the defective sectors per optical disk is reduced to several by the improvement in production technology of optical disks, it will not be necessary to examine all optical disks to be shipped. It will be sufficient to examine sampled optical disks.

The examination of the disk is performed by writing data on a specific test pattern in all the sectors of the disk and then reading the data from all the sectors. Such examination of the disk is also referred to as "certify processing".

In the examination of the disk, the slipping replacement algorithm is executed. As a result, one or more defective sectors are registered in the PDL.

Figure 11:
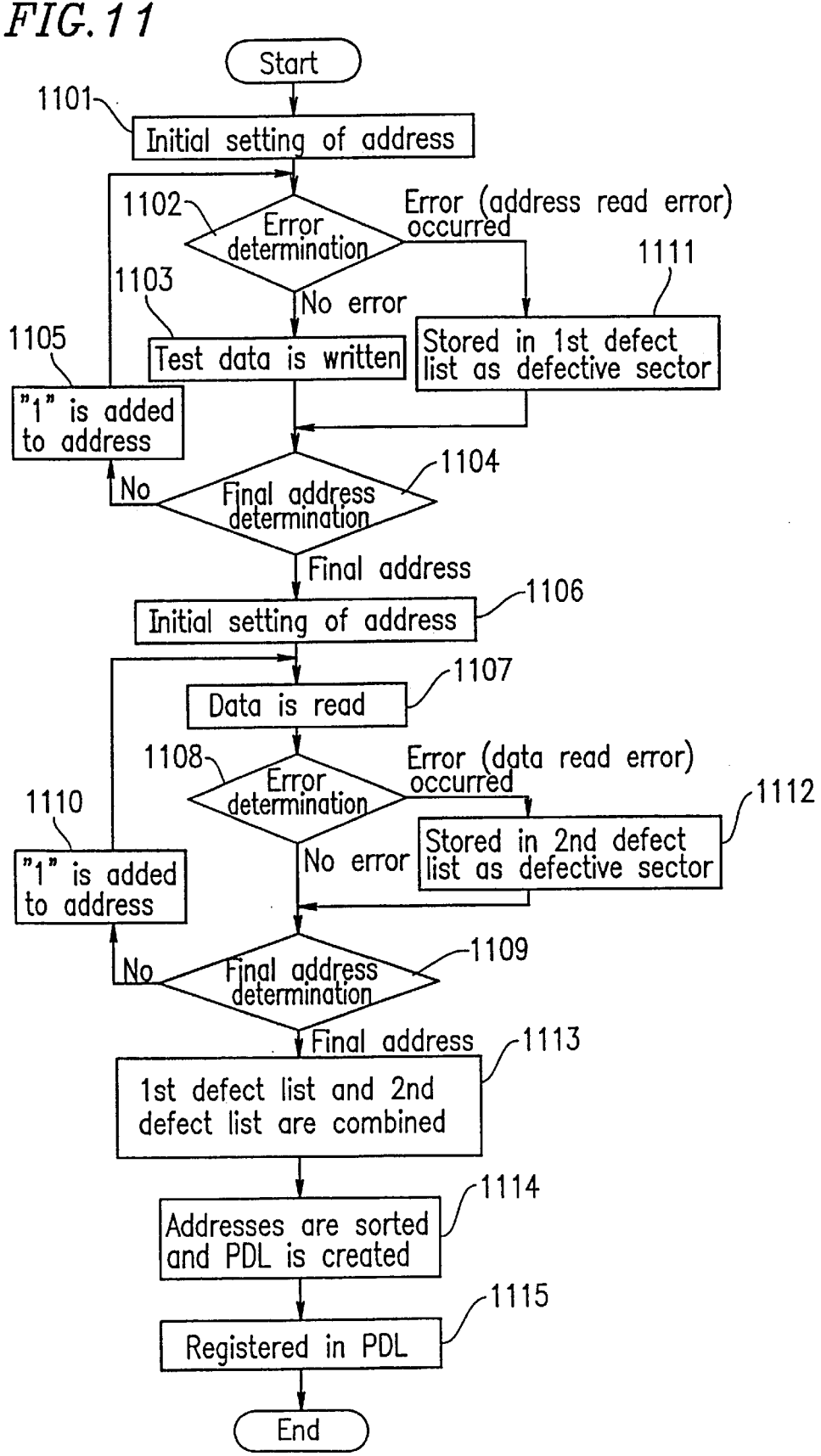
FIG. 11 is a flowchart illustrating a process of examination of a disk.

FIG. 11 is a flowchart illustrating a process of examination of the disk.

In step 1101, the address of a first sector of the user area 6 is set as a writing address. In step 1102, it is determined whether the sector address has been normally read or not. The reason why this is determined is that, since the sector address needs to be read in order to write the data in the sector, the data cannot be written in the sector if an error occurs in reading the sector address.

When it is determined that an error has occurred in reading the sector address in step 1102, the physical sector number of the defective sector is stored in a first defect list (step 1111).

When it is determined that no error has occurred in reading the sector address in step 1102, specified test data is written in the sector at the writing address (step 1103).

In step 1104, it is determined whether the writing address is a last address or not. When the writing address is determined not to be a last address, "1" is added in the writing address (step 1105). Then, the processing goes back to step 1102. Such processing is repeated; and when the writing address reaches the last address, the processing goes to step 1106.

In step 1106, the address of the first sector of the user area 6 is set as a reading address. In step 1107, data on the reading address is read. In step 1108, it is determined whether the read data is identical with the written data or not (i.e., whether the data was successfully written or not).

When it is determined an error has occurred in writing the data in step 1108, the physical sector number of the defective sector is stored in a second defect list (step 1112).

In step 1109, it is determined whether the reading address is the last address or not. When the reading address is determined not to be the last address, "1" is added in the reading address (step 1110). Then, the processing goes back to step 1107. In step 1108, error determination is performed. Such processing is repeated: and when the reading address reaches the last address, the first defect list and the second defect list are put together into one list (step 1113). The PDL is created by sorting the sectors in the list in the order of the physical sector number (step 1114). The PDL is recorded in the disk information area 4 together with the DDS (step 1115).

5.2 LSN Assignment

The LSN assignment is performed as described with reference to FIGS. 7 and 8. When a defective sector is registered in the PDL, the assignment of the LSNs is slipped in the direction toward an inner portion from an outer portion of the optical disk 1, with the location of the sector to which the last LSN is assigned being fixed. A sector to which LSN:0 is assigned is determined, and then the physical sector number of the sector to which LSN:0 is assigned is stored in the DDS.

Figure 12:
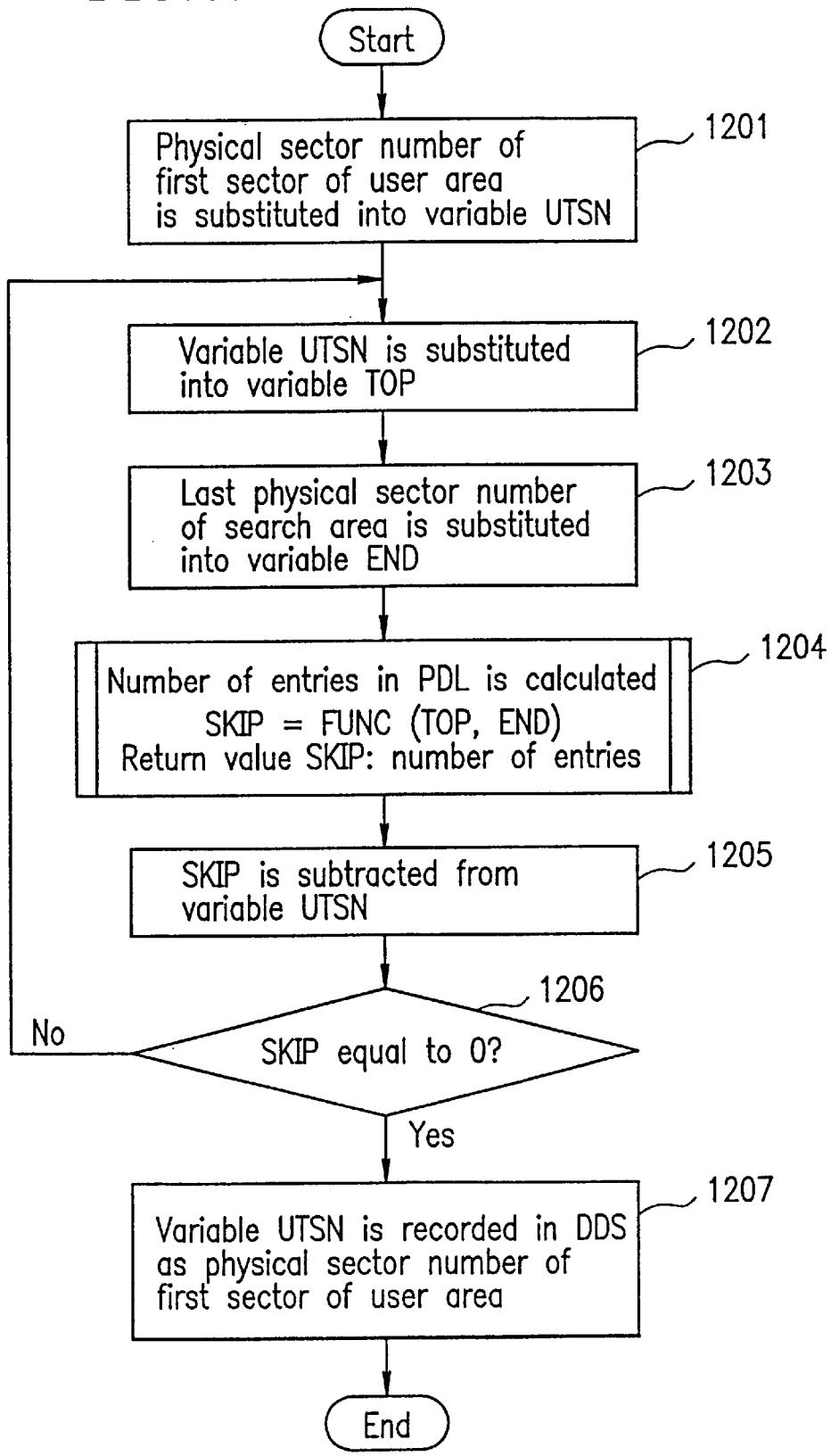
FIG. 12 is a flowchart illustrating a process of finding a physical sector number of a sector to which LSN:0 is assigned.

FIG. 12 is a flowchart illustrating a process of finding the physical sector number of the sector to which LSN:0 is assigned.

As initial setting, the physical sector number of the first sector of the user area 6 is substituted into a variable UTSN (step 1201). The value of the variable UTSN is written in the DDS in a later step.

Next, the value of the variable UTSN is substituted into a variable TOP (step 1202), and the physical sector number of the last sector of a search area is substituted into a variable END (step 1203). The search area is an area, the number of the defective sectors in which needs to be found. During a first loop, the physical sector number of the first sector of the user area 6 is substituted into the variable TOP, and the physical sector number of the last sector of the user area 6 is substituted into the variable END.

Based on the variable TOP and the variable END, the number of the defective sectors included in the search area is calculated (step 1204). For example, the number of the defective sectors included in the search area is given as a return value SKIP of a function FUNC (TOP, END).

The value of the variable UTSN is reduced by the return value SKIP. That is, UTSN=UTSN-SKIP is executed (step 1205). Thus, the physical sector number of the sector positioned at a location, obtained by skipping by the number of the defective sectors included in the user area 6 from the first sector in the user area 6, can be obtained.

Steps 1202 through 1205 are repeated until it is determined that the return value SKIP matches 0 in step 1206, in order to deal with the case where a sector in the spare area 7 is registered in the PDL as a defective sector.

The value of the variable UTSN obtained in this manner indicates the physical sector number of the sector to which LSN:0 is to be assigned. Accordingly, the value of the variable UTSN is stored in the DDS as the physical sector number of the first sector of the user area 6 (step 1207).

Figure 13:
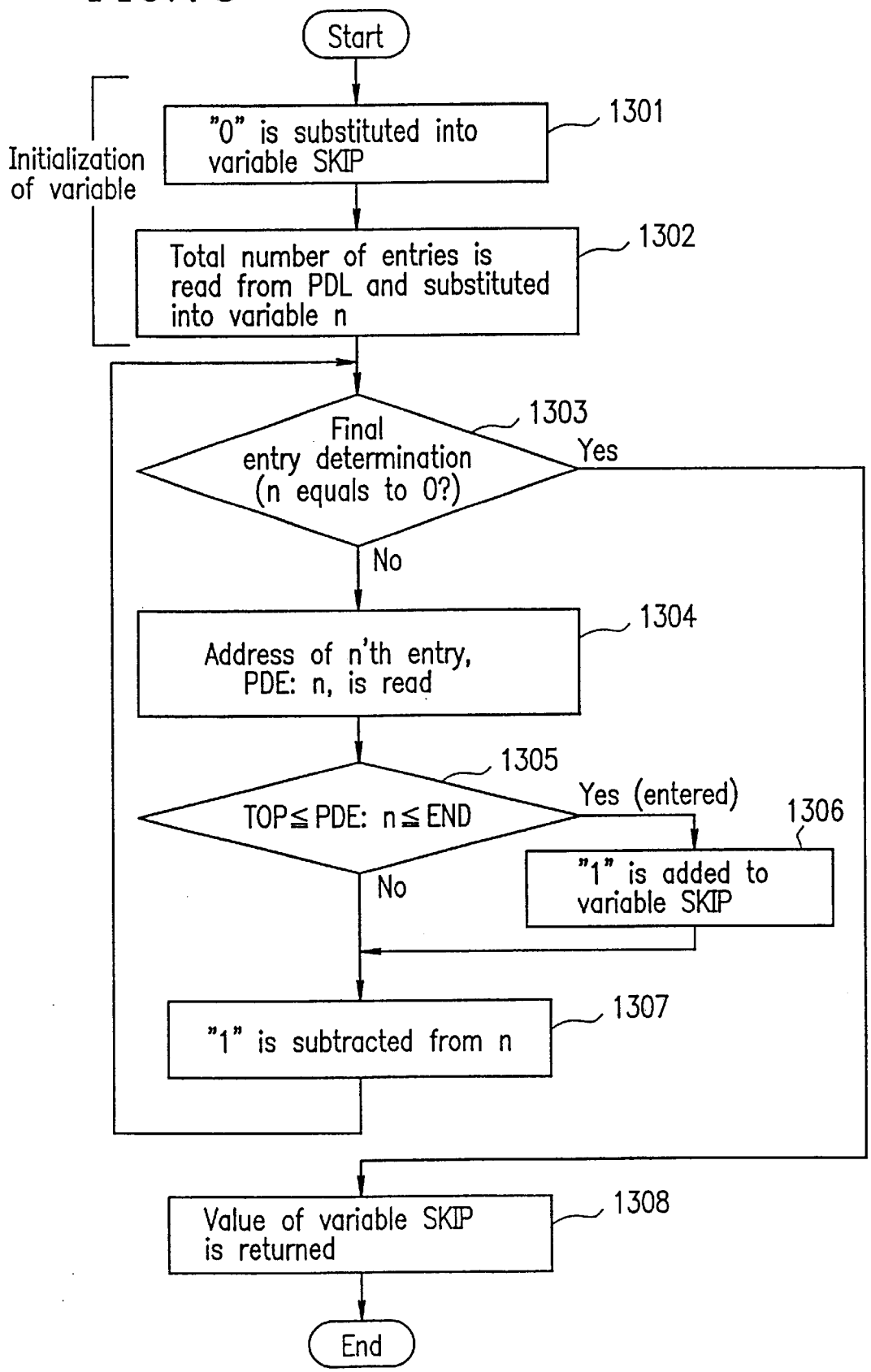
FIG. 13 is a flowchart illustrating a process of the function FUNC (TOP, END) shown in FIG. 12.

FIG. 13 is a flowchart illustrating a process of the function FUNC(TOP, END) in step 1204 shown in FIG. 12. The function FUNC (TOP, END) is realized by finding the number of entries in the PDL in the search area.

As initial setting, 0 is substituted into the variable SKIP, which indicates the number of entries (step 1301), and the total number of entries read from the PDL is substituted into a variable n (step 1302).

In step 1303, it is determined whether the value of the variable n is equal to 0 or not. When Yes, the value of the variable SKIP is returned as a return value of the function FUNC (TOP, END) in step 1308. When the total number of entries in the PDL is 0, value 0 is returned as the value of the variable SKIP, and the processing is terminated. When No in step 1303, the processing advances to step 1304.

The physical sector number (PDE:n) of the n'th entry is read from the PDL (step 1304). In step 1305, it is determined whether or not the PDE:n is equal to or greater than the value of the variable TOP and also equal to or smaller than the value of the variable END. When Yes, the search area is considered to include a defective sector registered in the PDL and "1" is added to the value of the variable SKIP (step 1306). When No in step 1305, the processing advances to step 1307.

In step 1307, "1" is subtracted from the value of the variable n, and the processing goes back to step 1303. In this manner, the operations in steps 1303 through 1307 are repeated for all the entries included in the PDL. Thus, the number of the defective sectors in the search area can be obtained as the value of the variable SKIP.

Figure 14:
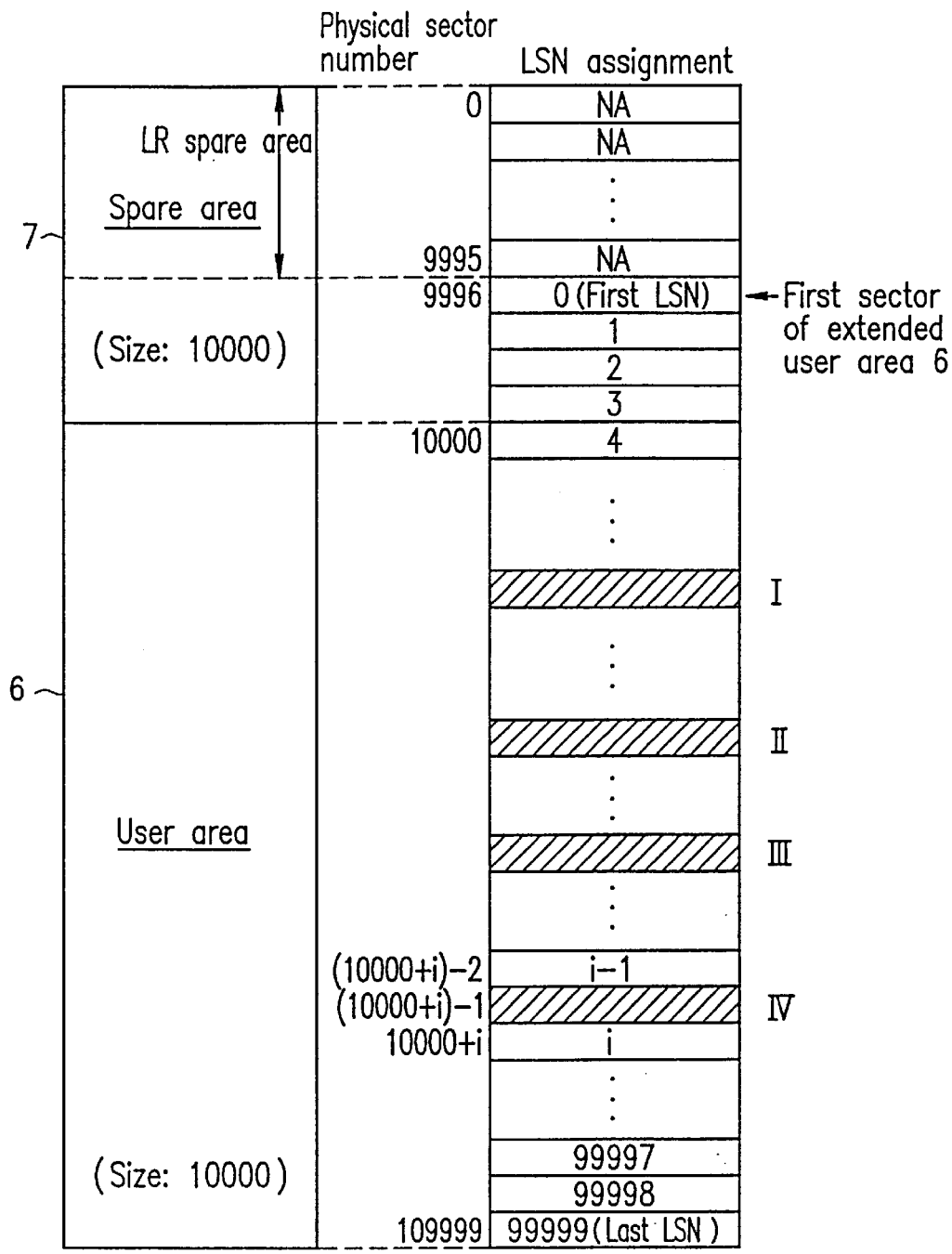
FIG. 14 is a diagram showing an example of LSNs assigned to the sectors after the examination of the disk.

FIG. 14 shows an example of assignment of the LSNs to the sectors. In the example shown in FIG. 14, it is assumed that the user area 6 has a size of 100000, the spare area 7 has a size of 10000, the number of entries registered in the PDL by the examination of the disk (i.e., the number of the defective sectors detected by the examination of the disk) is four, and the four defective sectors were all detected in the user area 6.

LSNs are assigned to the sectors in accordance with the slipping replacement algorithm described above.

First, LSN:99999, which is a last LSN, is assigned to a sector having a physical sector number:109999. Then, the LSNs are assigned to the sectors in a decreasing order toward an inner portion from an outer portion of the optical disk 1 (i.e., toward the spare area 7 from the user area 6). No LSN is assigned to the defective sectors. Instead, the LSN which would be assigned to each defective sector is assigned to a sector immediately before the defective sector. As a result, the assignment of the LSNs is slipped in the direction toward an inner portion from an outer portion of the optical disk 1 by the number of the defective sectors.

In the example shown in FIG. 14, the user area 6 includes four defective sectors I through IV as described above. LSN:0 through LSN:3, which would be assigned to the four sectors I through IV if the four sectors I through IV were not defective, are assigned to four sectors in the spare area 7, respectively, having physical sector numbers of 9996 through 9999. The reason for this is that the assignment of the LSNs are slipped by the number of the defective sectors (four in this example).

The physical sector number:9996 of the sector to which LSN:0 has been assigned is recorded in the DDS as the physical sector number of the first sector of the extended user area 6.

In FIG. 14, the sectors in the spare area 7 having the physical sector numbers of 0 through 9995 are collectively referred to as an "LR spare area". The LR spare area is defined as an area in the spare area 7 to which no LSN is assigned. The LR spare area is used as a replacing area in the linear replacement algorithm.

The physical sector number of the first sector of the LR spare area is fixed to 0. The physical sector number of the last sector of the LR spare area is obtained by subtracting 1 from the physical sector number recorded in the DDS. Accordingly, substantially no amount of calculation is required to access the LR spare area.

5.3 Recording of Initial Data in the File System

The disk recording and reproduction apparatus 100 records initial data of the file system to the optical disk 1 in accordance with a logical format instructed by the upper level apparatus 200. The logical format is represented using the LSN. The initial data is, for example, data recorded in the system reservation area 11, the FAT area 12 and the root directory area 13 (i.e., the file management area 10) shown in FIG. 3.

The area in which the initial data is recorded is managed by the upper level apparatus 200 using the LSN. Especially, a first sector of the system reservation area 11 needs to be a sector to which LSN:0 is assigned. Accordingly, the upper level apparatus 200 cannot instruct the disk recording and reproduction apparatus 100 to record the initial data unless the LSN is determined. The content of the initial data is determined by the upper level apparatus 200.

The defect management during the recording of the initial data is performed in accordance with the linear replacement algorithm. The processing for recording the initial data is identical with the processing for recording data in the file management area 10 described below in section 5.4.2, and thus detailed description thereof is omitted here.

5.4. Recording of Data (Recording of the File System and the File Data)

Figure 15:
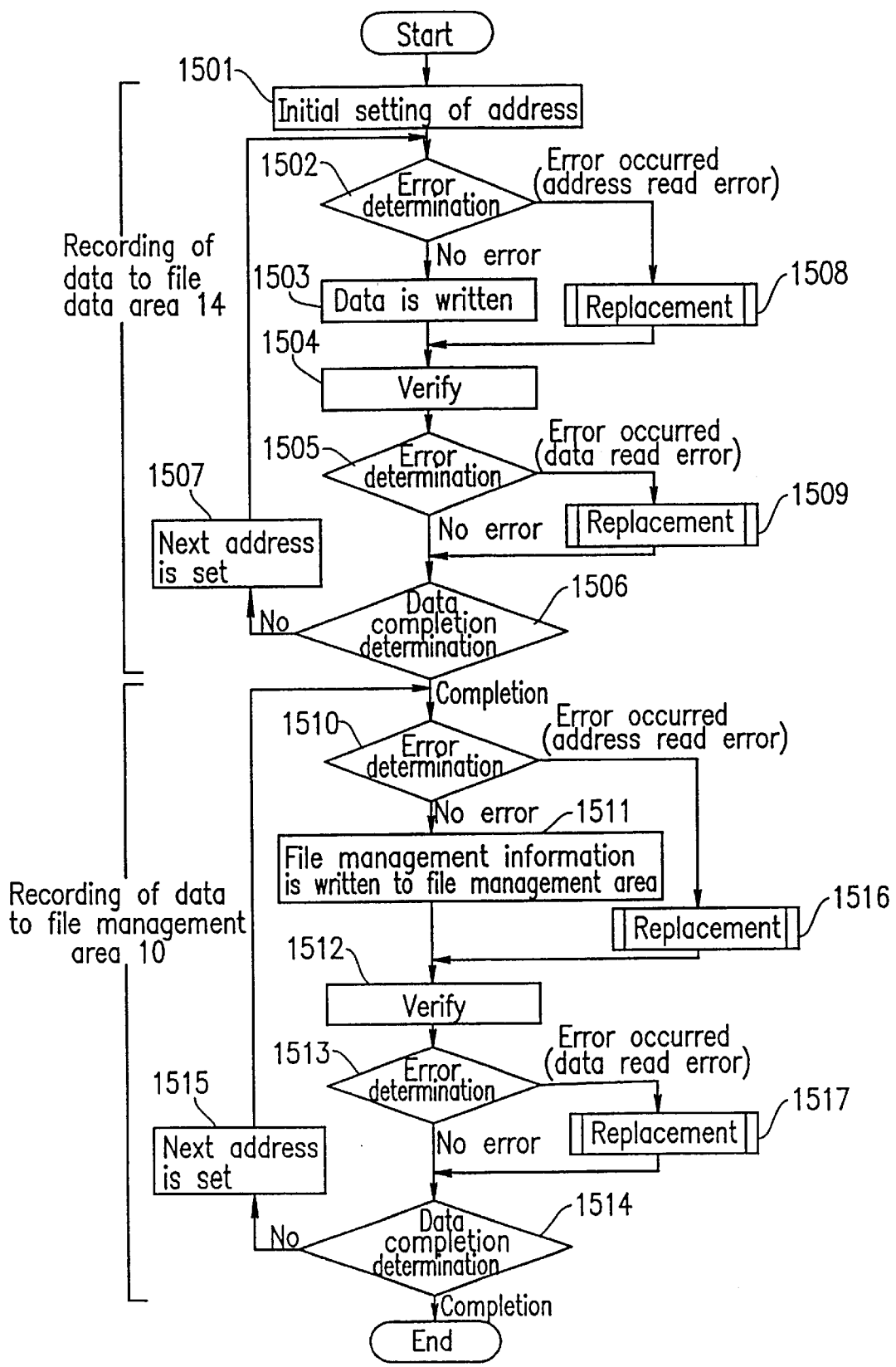
FIG. 15 is a flowchart illustrating a process of recording data to the optical disk 1.

FIG. 15 is a flowchart illustrating a process of recording data to the optical disk 1. The processing shown in FIG. 15 includes recording of data in the file data area 14 (steps 1501 through 1509) and recording of data in the file management area 10 (steps 1510 through 1517).

5.4.1 Recording of Data in the File Data Area 14

In step 1501, a writing address is set. The writing address is an LSN of a first sector of the file data area 14 (i.e., recording area) in which data is to be written. The LSN is determined by the upper level apparatus 200, referring to the FAT which manages locations of files and empty areas, and then is sent to the disk recording and reproduction apparatus 100.

The FAT is read from the optical disk 1 by the disk recording and reproduction apparatus 100 before data is written, and then is stored in the main memory 204 of the upper level apparatus 200. The CPU 201 refers to the FAT stored in the main memory 204 to determine the LSN of the first sector of the recording area. The resultant LSN is stored in the memory 104 of the disk recording and reproduction apparatus 100 together with a recording instruction command. The microprocessor 101 executes the operations in the following steps based on the LSN stored in the memory 104.

In step 1502, it is determined whether the sector address has been normally read or not. The reason why this is determined is that, since the sector address needs to be read in order to write data into the sector, the data cannot be written in the sector when an error occurs in reading the sector address.

When it is determined that an error has occurred in step 1502, the defective sector is replaced with a normal sector in the LR spare area (FIG. 14) in step 1508.

When it is determined that no error has occurred in reading the sector address in step 1502, data is written in a sector of the file data area 14 designated by the LSN. The data is sent from the I/O bus 205 of the upper level apparatus 200, buffered in the memory 104, and written in the file data area 14.

In step 1504, verify processing is performed. The verify processing refers to reading data from the sector in which the data was written in step 1503 and comparing the read data with the written data or performing an operation using an error correction code to check whether the data was successfully written or not.

In step 1505, it is determined whether an error has occurred or not. When it is determined that an error has occurred, the defective sector is replaced with a normal sector in the LR spare area (FIG. 14) in step 1509.

In step 1506, it is determined whether all the data has been recorded or not. When it is determined that all the data has been recorded, a writing address is set at the next LSN (step 1507). Then, the processing goes back to step 1502. Such processing is repeated. When it is determined that all the data has been recorded, the recording of the data in the file data area 14 is completed.

Figure 16:
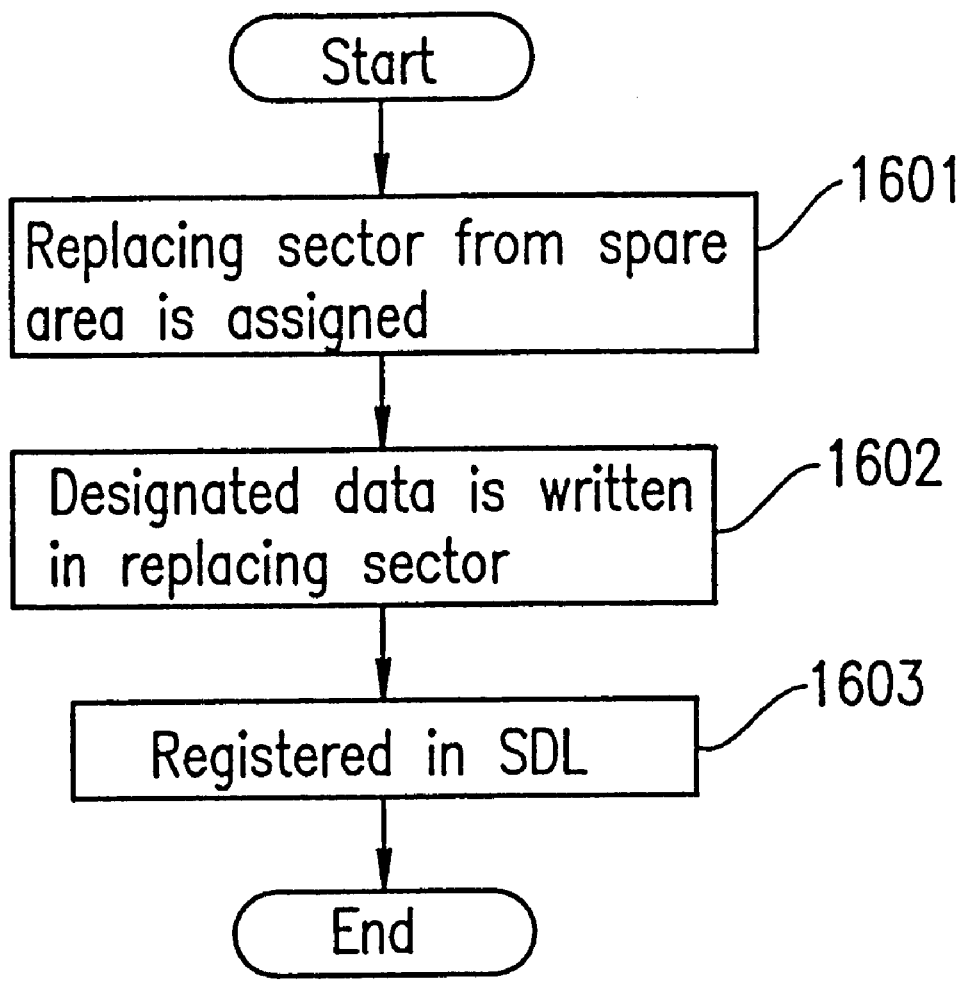
FIG. 16 is a flowchart illustrating a process of replacement processing executed in steps 1508 and 1509 shown in FIG. 15.

FIG. 16 is a flowchart illustrating a process of replacement processing executed in steps 1508 and 1509 shown in FIG. 15.

In step 1601, a sector in the spare area 7 to which no LSN is assigned (i.e., a sector in the LR spare area) is used as a replacing sector.

In step 1602, data which was to be recorded in the defective sector is recorded in the replacing sector. Although not shown in FIG. 16, operations corresponding to those in steps 1502 through 1509 in FIG. 15 are performed in order to write the data in the replacing sector. When an error is detected when writing the data in the replacing sector, another sector in the LR spare area is used as the replacing sector.

In step 1603, the physical sector number of the defective sector and the physical sector number of the replacing sector are registered in the SDL. Thus, the defective sector is associated with the replacing sector used instead of the defective sector.

The optical disk 1 is not accessed to update the SDL each time the operation in step 1603 is executed. In step 1603, the physical sector number of the defective sector and the physical sector number of the replacing sector are stored in a defect list stored in the memory 104. After it is determined that all the data has been recorded in step 1506 in FIG. 15, the SDL is created and recorded in the disk information area 4. Processing time is shortened by minimizing the number of times of accessing the optical disk 1 in this manner.

5.4.2 Recording of Data in the File Management Area 10

After the recording of the data in the file data area 14 is completed, the data is recorded in the file management area 10. The reason for this is that, since management data such as, for example, FAT is updated by recording the data in the file data area 14, the updated management data needs to be recorded in the file management area 10.

The processing of recording the data in the file management area 10 (steps 1510 through 1517 in FIG. 15) is identical with the processing of recording the data in the file data area 14 (steps 1501 through 1509 in FIG. 15) except for the content of the data and the recording area. Therefore, a detailed description of the recording of the data in the file management area 10 is omitted.

Figure 17:
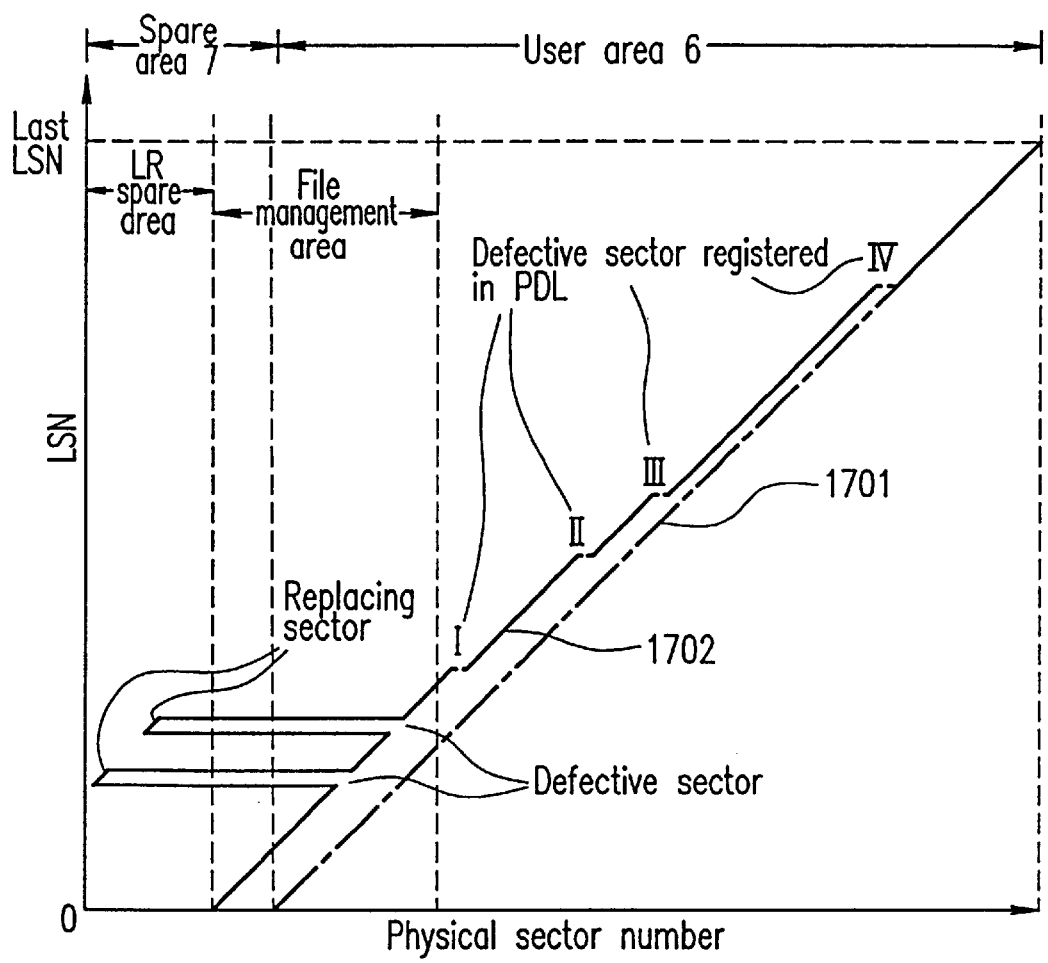
FIG. 17 is a graph illustrating the correspondence between physical sector numbers and LSNs after the slipping replacement algorithm shown in FIG. 7 and the linear replacement algorithm shown in FIG. 9 are executed.

FIG. 17 shows the correspondence between the physical sector numbers and the LSNs after the slipping replacement algorithm and the linear replacement algorithm are executed. The horizontal axis represents the physical sector number, and the vertical axis represents the LSN. In FIG. 17, chain line 1701 indicates the correspondence between the physical sector numbers and the LSNs when the user area 6 includes no defective sector. Solid line 1702 indicates the correspondence between the physical sector numbers and the LSNs when the four defective sectors are registered in the PDL and two defective sectors are registered in the SDL.

In the example shown in FIG. 17, two defective sectors are detected when the data is recorded in the file management area 10. The two defective sectors are replaced with replacing sectors in the LR spare area in the spare area 7.

The file management area 10 is located in an area starting with LSN:0. It can be appreciated from FIG. 17 that the distance (number of physical sectors) between the defective sector in the file management area 10 and the replacing sector in the spare area 7 is significantly shortened compared to that of the conventional art (FIG. 27). For example, the distance in this example (FIG. 17) is about 10000 whereas the distance in the conventional art (FIG. 27) is 100000 or more. The shortened distance enhances the access speed to the optical disk 1.

5.5 Reproduction of the Data

For reproducing the data, the upper level apparatus 200 refers to the management data such as, for example, FAT to search for the location of a file. The upper level apparatus 200 instructs the disk recording and reproduction apparatus 100 to access the file management area 10 to refer to the management data. The disk recording and reproduction apparatus 100 accesses the sector to which LSN:0 is assigned, with certainty. The physical sector number of the sector is recorded in the DDS. Accordingly, the disk recording and reproduction apparatus 100 can access the sector to which LSN:0 is assigned at a high speed by referring to the DDS.

The upper level apparatus 200 instructs the reading location in the file data area 14 to the disk recording and reproduction apparatus 100 using the LSN. The disk recording and reproduction apparatus 100 refers to the PDL and the SDL to convert the LSN designated by the upper level apparatus 200 to a physical sector number and reads the data from the sector having the physical sector number.

As described above, in the first example according to the present invention, the spare area 7 is located radially inward from the user area 6 of the optical disk 1. The assignment of LSNs is slipped in the direction toward an inner portion from an outer portion, with the location of the sector to which the last LSN is assigned being fixed. The location of the sector to which the first LSN (LSN:0 ) is assigned is recorded in the DDS.

The last LSN is not necessarily assigned to the last sector of the user area 6. When the last sector of the user area 6 is a defective sector, the last LSN is assigned to a normal sector in the user area 6 closest to the last sector.

In the first example according to the present invention, the defect management is performed on a sector-by-sector basis. Alternatively, the defect management can be performed on a block-by-block basis, each block including a plurality of sectors. In such a case, block numbers are registered in the PDL and the SDL instead of the physical sector numbers. The defect management can be performed by any appropriate unit. The same effect can be obtained regardless of the unit.

In the first example according to the present invention, the upper level apparatus 200 and the disk recording and reproduction apparatus 100 are connected to each other through the I/O bus 205. Alternatively,the upper level apparatus 200 and the disk recording and reproduction apparatus 100 can be connected to each other in any manner (e.g., with wires or in a wireless manner). The elements in the disk recording and reproduction apparatus 100 can be connected to one another in any manner.

EXAMPLE 2

Methods for managing a defect of an optical disk which are preferable to AV files (Audio Visual Data Files; i.e., time-continuous video and audio data files), for which real-time recording and reproduction is important have been proposed in, for example, Goto et al., International Publication WO98/14938. According to such methods, when AV files are recorded in the optical disk 1, defect management is performed using a file system which is managed by the upper level apparatus 200 without performing replacement processing based on the linear replacement algorithm.

Hereinafter, an example of a method for managing a defect of an optical disk according to the present invention applied to an AV file system will be described.

The information processing system has the structure shown in FIG. 1. The optical disk 1 has the physical structure shown in FIG. 2 and the logical structure shown in FIG. 3. The file system is different from the MS-DOS file system described in the first example, but is common therewith in that the file management area 10 is positioned at a location in the user area 6 having a fixed LSN.

6. Operation of the Disk Recording and Reproduction Apparatus 100

The disk recording and reproduction apparatus 100 performs the operations of 6.1 through 6.3 as initialization of the optical disk 1.

6.1: Examination of the Disk 6.2: LSN Assignment 6.3: Recording of Initial Data in the File System After performing the initialization, the optical recording and reproduction apparatus 100 performs the operations of 6.4 and 6.5 each time a file is written or read.

6.4 Recording of Data (Recording of the File System and the File Data)

6.5 Reproduction of the Data

The operations of 6.1, 6.2, 6.3 and 6.5 are identical with those of 5.1, 5.2, 5.3 and 5.5, and will not be described in detail.

6.4 Recording of Data (Recording of the File System and the File Data)

Figure 18:
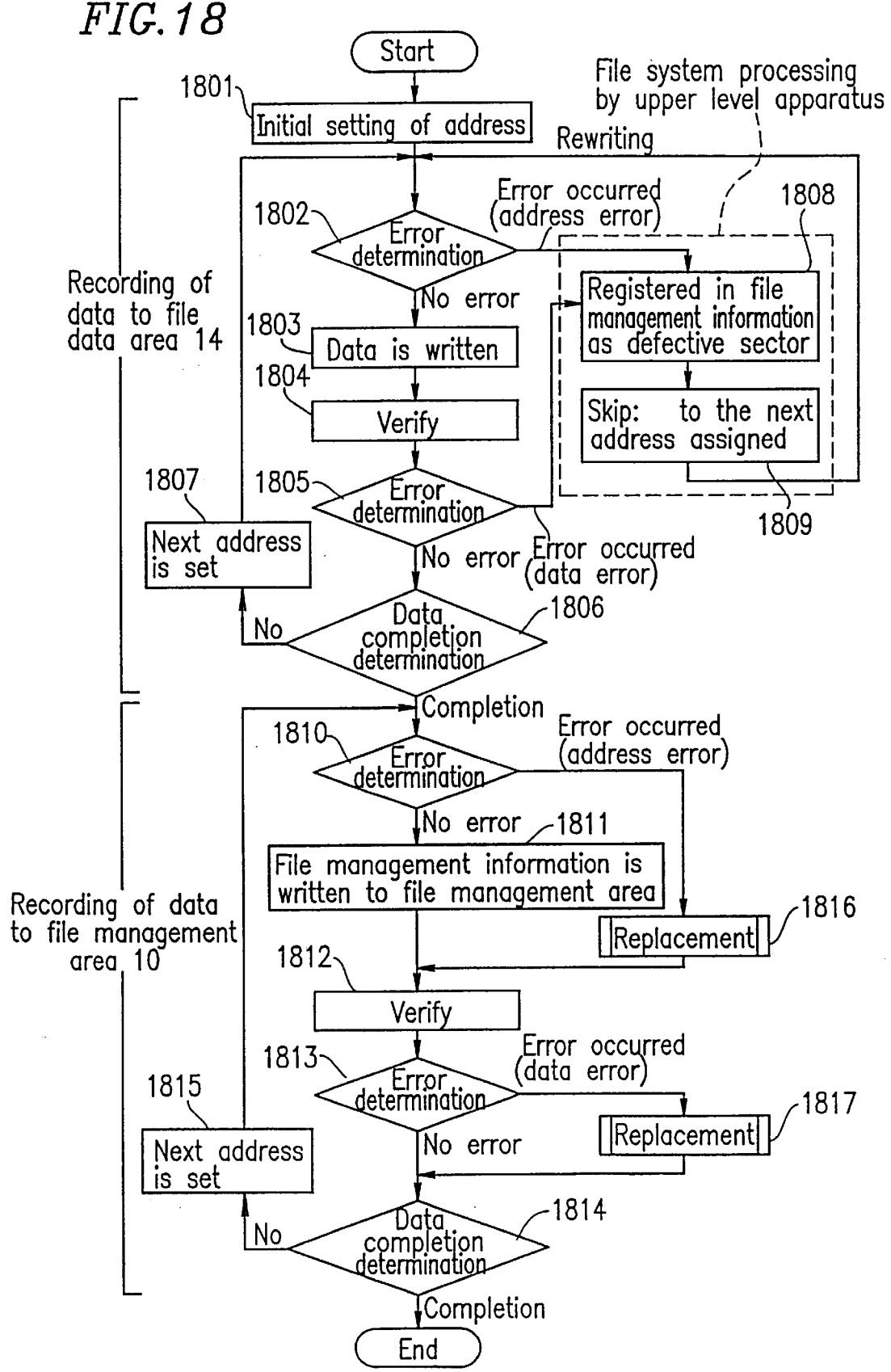
FIG. 18 is a flowchart illustrating a process of recording an AV file in the optical disk 1.

FIG. 18 is a flowchart illustrating a process of recording data in the optical disk 1. The processing shown in FIG. 18 includes recording of an AV file in the file data area 14 (steps 1801 through 1809) and recording of the AV file in the file management area 10 (steps 1810 through 1817).

6.4.1 Recording of the AV File in the File Data Area 14

The upper level apparatus. 200 issues an AV file recording command to the disk recording and reproduction apparatus 100. The disk recording and reproduction apparatus 100 receives the AV file recording command and executes the processing of recording the AV file in the file data area 14.

The processing of recording the AV file in the file data area 14 (FIG. 18) is identical with the processing of recording the data in the file data area 14 (FIG. 15) except for steps 1808 and 1809.

In step 1808, an area including a defective sector is registered in the file management information as a defective area.

In step 1809, an empty area continuous to the defective area is set. Then, the processing goes back to step 1802.

As can be appreciated from above, the disk recording and reproduction apparatus 100 does not perform replacement processing even when a defective sector is detected when an AV file recording command is received.

Figure 19:
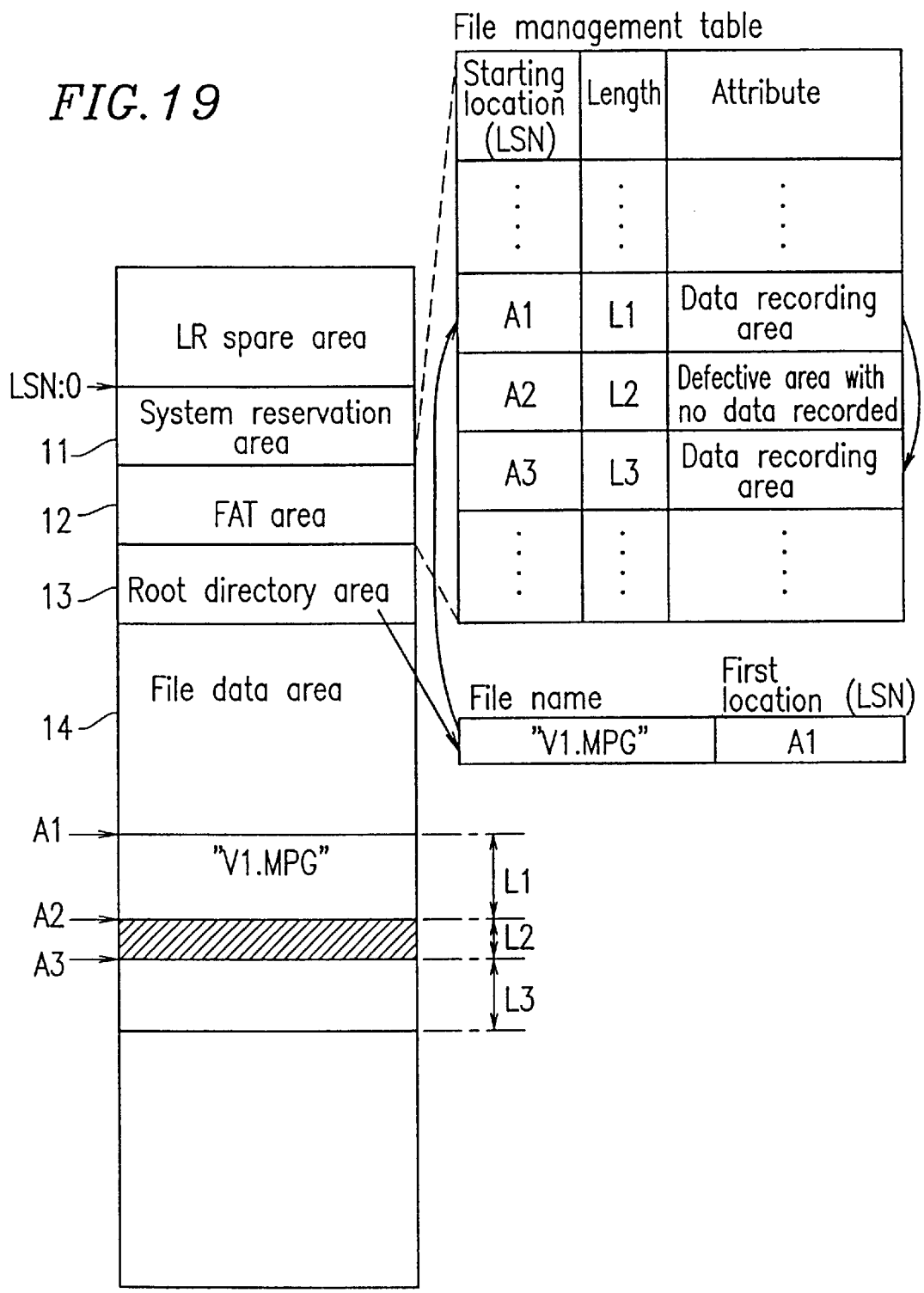
FIG. 19 is a diagram showing a structure of a data recording area having the AV file recorded therein.

FIG. 19 shows a data recording area 5 after the AV file is recorded.

It is assumed that an AV file referred to as "V1.MPG" (hereinafter, referred to as the "V1.MPG file") is recorded in the file data area 14 and a defective sector is detected in the AV file. In FIG. 19, a defective area including the defective sector is hatched. A1, A2 and A3 represent a first LSN of each area, and L1, L2 and L3 represent a length of each area. The first LSN of the defective area is A2, and the length thereof is L2.

The V1.MPG file is managed by a file management table stored in the FAT area 12. The file management table is linked with a file entry of the V1.MPG file stored in the root directory area 13.

The file management table includes therein the first LSNs and lengths of the areas in which the AV file is located. The file management table further includes attribute data for identifying whether data has been recorded in the area or the area is a defective area in which no data has been recorded. In step 1808 shown in FIG. 18, attribute data of an area starting from LSN:A2 and having a length of L2 is set to be a defective area in which no data has been recorded. Thus, at the time of reproduction, this area is recognized to be defective. As a result, reproduction of the defective area can be skipped.

In the example shown in FIG. 19, the file management table includes information on three areas on the V1.MPG file. The file management table shown in FIG. 19 indicates that an area starting from LSN:A1 and having a length of L1 and another area starting from LSN:A3 and having a length of L3 have data recorded therein and that the area starting from LSN:A2 and having a length of L2 has no data recorded therein.

As can be appreciated from the above, the file management table allows a defective area to be identified based on the LSN. For reproducing the V1.MPG file, the AV file can be continuously reproduced while skipping the defective area.

The recording based on the AV file recording command is performed on a block-by-block basis, each block including a plurality of sectors because the size of the AV file is relatively large. Accordingly, the information stored in the FAT area 12 and the root directory area 13 has block addresses. The size of the file system management information is reduced by managing the data on a block-by-block basis. The block-by-block recording can be performed by repeating sector-by-sector recording a plurality of times. Accordingly, the fundamental operation of the disk recording and reproduction apparatus 100 is similar to the operation described above.

6.4.2 Recording of Data in the File Management Area 10

The processing of recording the AV file in the file management area 10 (FIG. 18) is identical with the processing of recording the data in the file management area 10 (FIG. 15). When a detective sector is detected when the AV file is recorded in the file management area 10, replacement processing is performed in steps 1816 and 1817. The reason for this is that the defective sector detected in the file management area 10 storing the file management table cannot be logically managed by the file management table.

When data for which real-time recording and reproduction is not very important, such as, for example, computer data (hereinafter, referred to as the "PC data") is recorded in the optical disk 1, the upper level apparatus 200 issues a PC file recording command to the disk recording and reproduction apparatus 100. The operations of the disk recording and reproduction apparatus 100 in this case are identical with the operations of 5.1 through 5.5.

As described above, a method for managing a defect of an optical disk which is suitable to AV files is provided in the second example according to the present invention.

EXAMPLE 3

A ZCLV system information recording medium, in which the combined spare area and user area is divided into a plurality of zones which have different disk rotation speeds, such as a DVD-RAM disk or the like, has a guard area on the border between adjacent zones.

Figure 20:
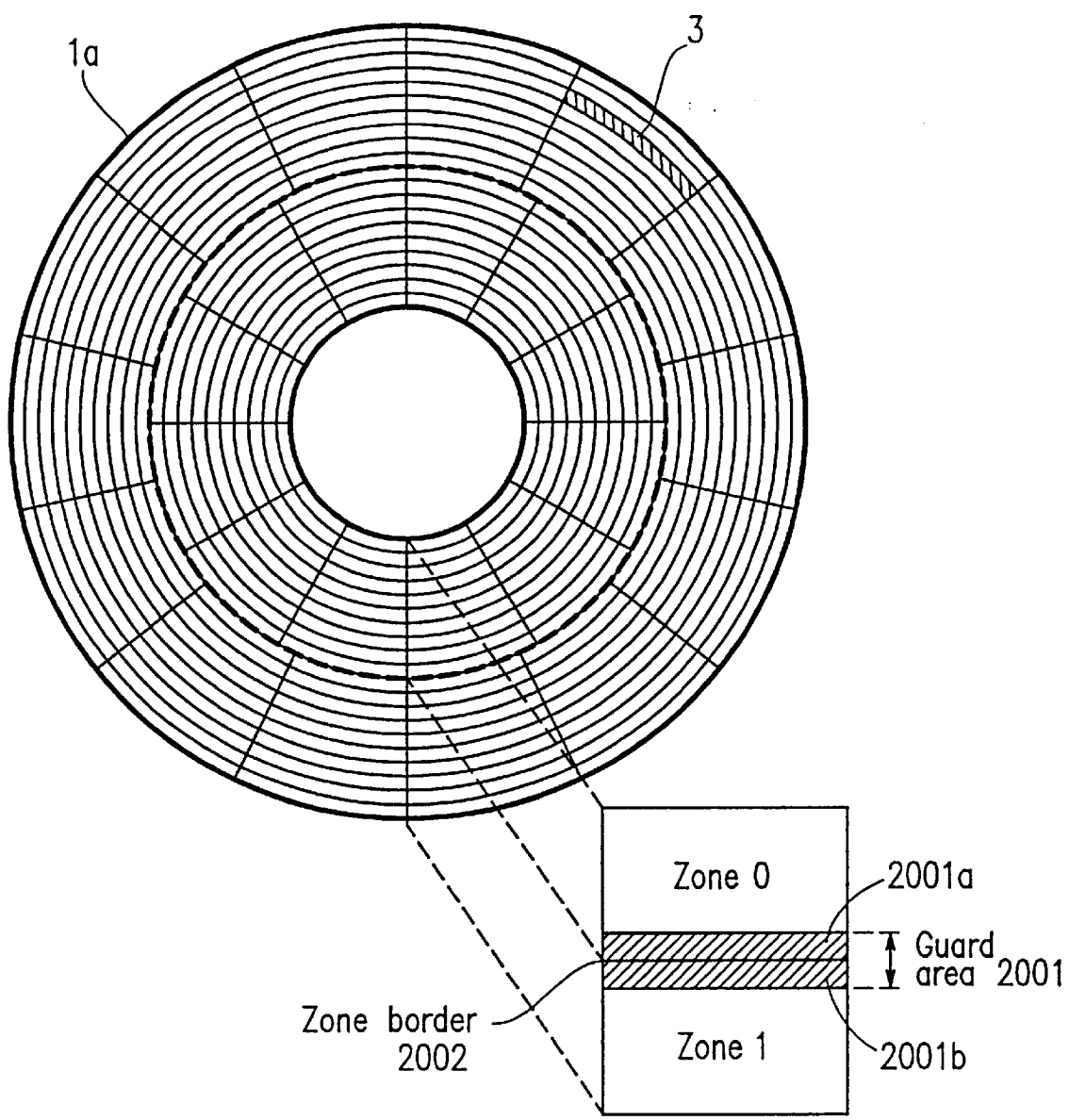
FIG. 20 is a diagram showing a physical structure of an optical disk having two zones.

FIG. 20 shows a physical structure of an optical disk 1a having two zones. The optical disk 1a has zone 0 in an inner part thereof and zone 1 located radially outward from zone 0. A guard area 2001 is provided on the border between zones 0 and 1 so as to cover a part of each zone. A part 2001a of the guard area 2001 in zone 0 and a part 2001b of the guard area 2001 in zone 1 each include at least one track.

The part 2001a and the part 2001b of the guard area 2001 have tracks of different structures. Accordingly, the signal quality in the guard area 2001 is inferior., and therefore the guard area 2001 is not suitable for recording. The guard area 2001 is set as an area in which no data is to be recorded. The locations and sizes of the zones 0 and 1 and guard area 2001 are fixed based on the optical disk 1a.

The structure of the information processing system is as shown in FIG. 1. The logical structure of the optical disk 1a is identical with that of the optical disk 1 shown in FIG. 3.

Figure 21:
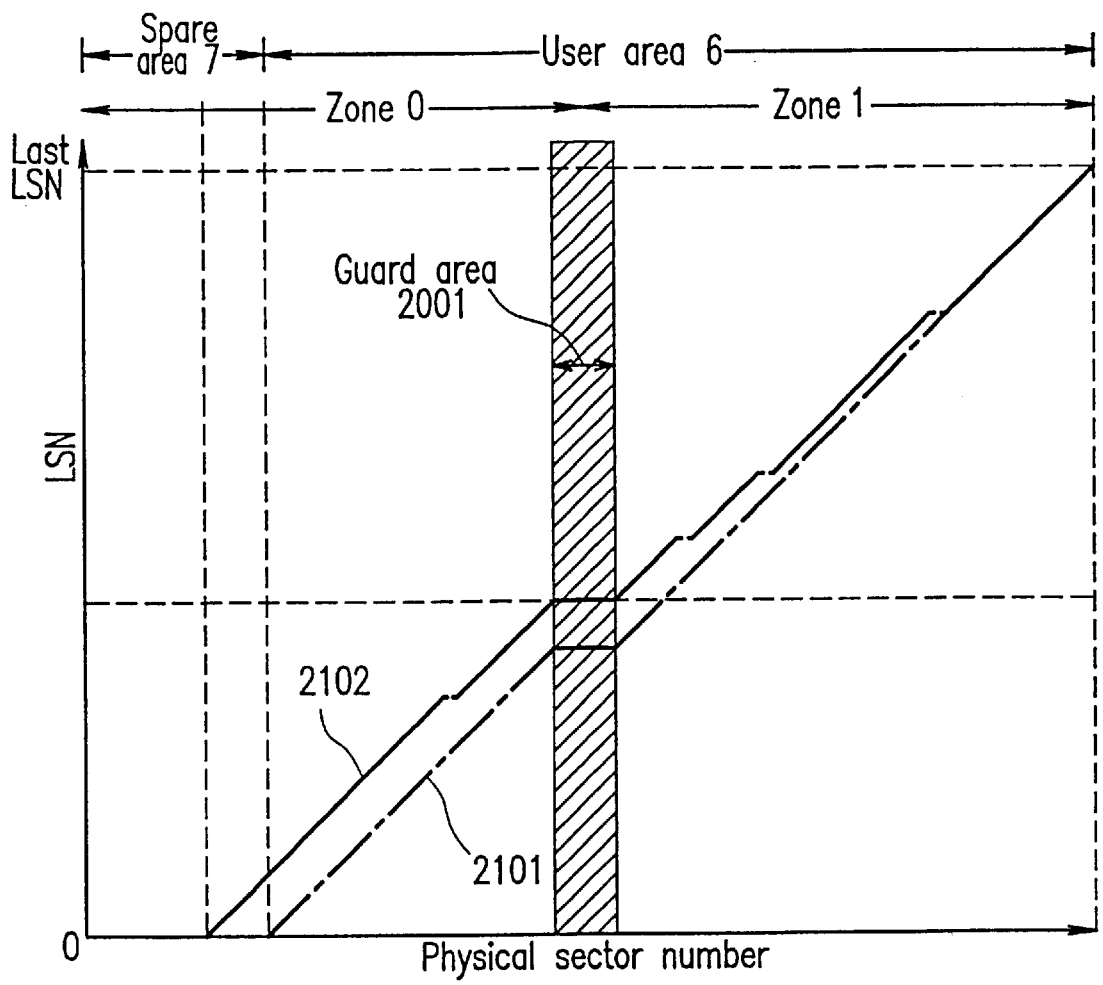
FIG. 21 is a graph illustrating the correspondence between physical sector numbers and LSNs of the optical disk shown in FIG. 20 after the slipping replacement algorithm shown in FIG. 7 is executed.

FIG. 21 shows the correspondence between the physical sector numbers and the LSNs after the slipping replacement algorithm is executed. The horizontal axis represents the physical sector number, and the vertical axis represents the LSN. In FIG. 21, chain line 2101 indicates the correspondence between the physical sector numbers and the LSNs when the user area 6 includes no defective sector. Solid line 2102 indicates the correspondence between the physical sector numbers and the LSNs when the user area 6 includes four defective sectors.

As shown in FIG. 21, no LSN is assigned to the defective sectors. The assignment of the LSNs are slipped in the direction toward an inner portion from an outer portion of the optical disk 1a (i.e., in the decreasing direction of the physical sector number) as in the first and the second examples.

As also shown in FIG. 21, no LSN is assigned to the guard area 2001. The assignment of the LSNs is performed so that the LSNs are continuous between two ends of the guard area 2001. Accordingly, data is not recorded in the guard area 2001.

The spare area 7 and the file management area 10 having a first sector to which LSN:0 is assigned are located in the same zone. Accordingly, the processing of replacing a defective sector which is detected when the data is recorded in the file management area 10 can be performed in a single zone, without requiring a seek operation across the border between the zones.

In a DVD-RAM disk, an error correction code is calculated over a plurality of sectors. Therefore, the plurality of sectors is defined as one block. For example, an ECC block includes 16 sectors. In such a case, the optical disk is designed so that multiples of the block size are equal to the size of each zone. However, when LSNs are assigned in accordance with the slipping replacement algorithm, one block can possibly be located over two zones across the guard area 2001 depending on the number of detected defective sectors. The reason for this is that the number of LSNs assigned to each zone varies in accordance with the number of the defective sectors.

Figure 22A:
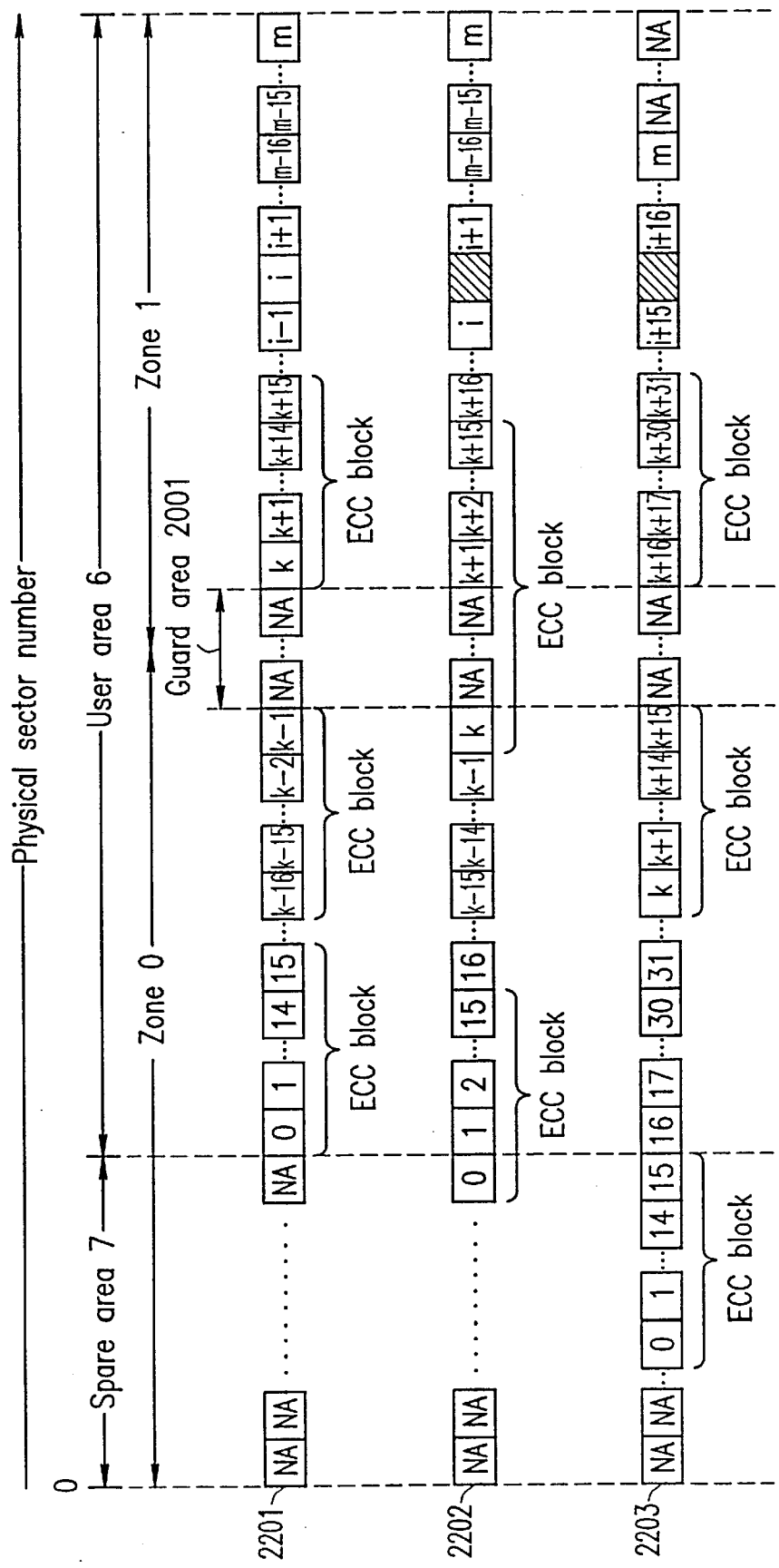
FIG. 22A is a conceptual view of a slipping replacement algorithm according to the present invention.

FIG. 22A is a conceptual view of a slipping replacement algorithm executed by the disk recording and reproduction apparatus 100 (FIG. 1) on the optical disk 1a. In FIG. 22A, each of the rectangle boxes represents a sector. Characters in each sector represent an LSN assigned to the sector. The rectangle boxes having an LSN represent normal sectors, and the hatched rectangle boxes represent a defective sector. In the example shown in FIG. 22A, an ECC block for calculating the error detection code includes 16 continuous sectors. However, the number of the sectors included in the ECC block is not limited to 16. An ECC block can include any number of sectors.

Reference numeral 2201 represents a sequence of sectors including no defective sector in the user area 6. Reference numeral 2202 represents a sequence of sectors including one defective sector in the user area 6 (with no block correction). Reference numeral 2203 represents a sequence of sectors including one defective sector in the user area 6 (with block correction). Block correction will be described below.

When a last sector in zone 1 is a normal sector, the last LSN:m is assigned to the last sector of zone 1. LSNs are assigned to the plurality of sectors included in the user area 6 in a decreasing order from the sector to which the last LSN:m is assigned.

When the user area 6 includes no defective sector, LSN:m through LSN:0 are sequentially assigned from the last sector to the first sector in the user area 6 as represented by the sequence of sectors 2202.

When a sector in the sequence of sectors 2201 to which LSN:i is assigned was a defective sector, the assignment of the LSNs is changed so that LSN:i is not assigned to the defective sector but to a sector immediately before the defective sector. Thus, the assignment of the LSNs is slipped by one sector in the direction toward the spare area 7 from the user area 6. As a result, LSN:0 is assigned to a last sector of the spare area 7 as represented by the sequence of sectors 2202.

In the sequence of sectors 2202, an ECC block to which LSN:k through LSN:k+15 are assigned is located over the zones 0 and 1 across the border. In order to prevent one ECC block from being located over two or more zones, block correction is performed.

A sequence of sectors 2203 is obtained as a result of block correction performed on the sequence of sectors 2201. The sequence of sectors 2202 includes one defective sector in zone 1. In this case, the sector 2203 is obtained by slipping the LSN assignment to the sequence of sectors 2202 by 15(=16−1) sectors in the direction toward the spare area 7 from the user area 6.

As described above, when the user area 6 includes a defective sector, block correction of the LSN assignment is performed so that the first sector of each zone matches the first sector of the ECC block of the zone. Such an operation prevents one block from being located over a plurality of zones. As a result, an access to a plurality of zones does not occur when recording and reproduction is performed to and from one block. This allows the time period required for recording or reproduction of data to be shortened. This also allows data in one block to be read continuously. Therefore, a memory for calculation and an operation apparatus which are required for preliminary pipeline processing can be curtailed without disturbing the pipeline processing of error correction.

Figure 22B:
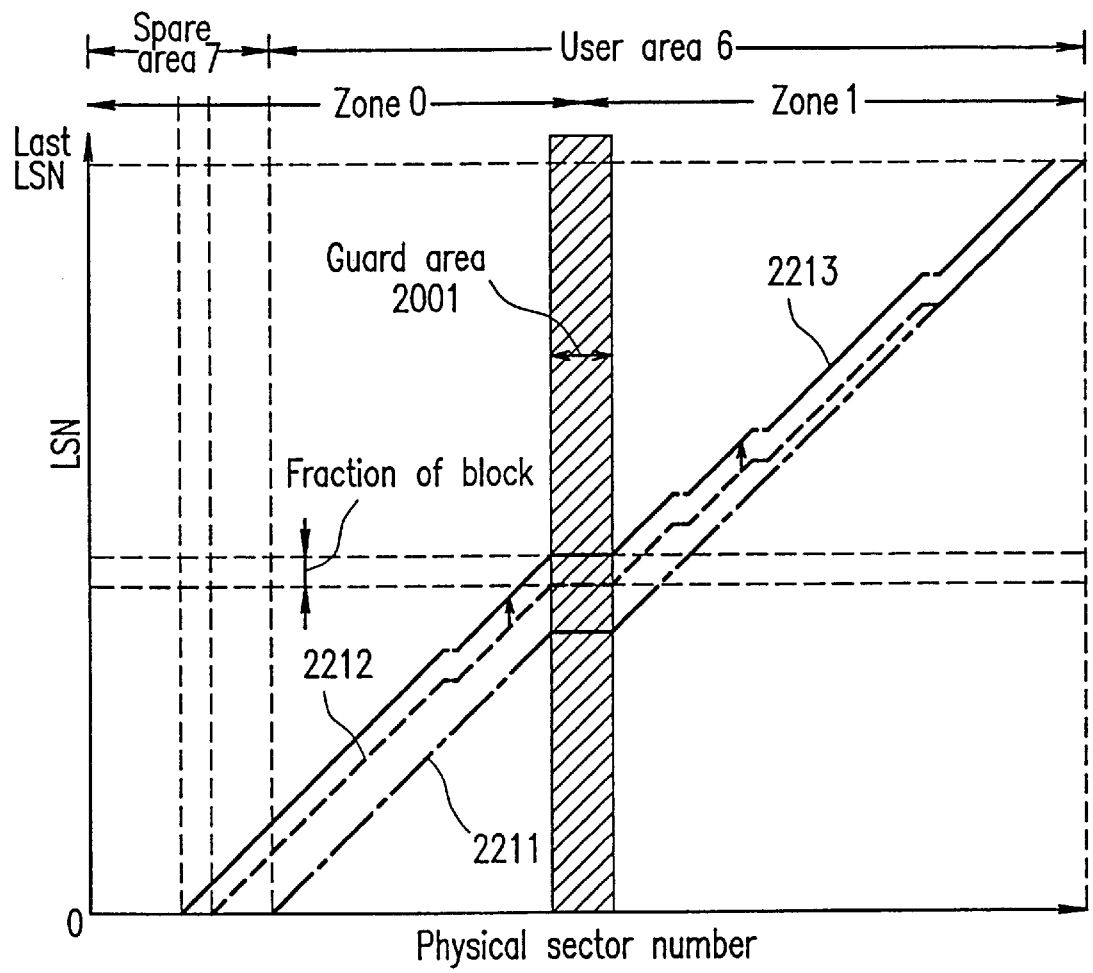
FIG. 22B is a graph illustrating the correspondence between physical sector numbers and LSNs after the slipping replacement algorithm shown in FIG. 22A is executed.

FIG. 22B shows the correspondence between the physical sector numbers and the LSNs after the slipping replacement algorithm described with reference to FIG. 22A is executed. The horizontal axis represents the physical sector number, and the vertical axis represents the LSN. In FIG. 22B, chain line 2211 is identical with chain line 2101 in FIG. 21, and dashed line 2212 is identical with chain line 2102 in FIG. 21.

It is assumed that, as a result of performing assignment of the LSNs represented by dashed line 2212, one block is located across the guard area 2001; i.e., a part of the block is located in zone 0 and the rest of the block (fraction of the block) is located in zone 1.

In this case, the assignment of the LSNs is performed in an increasing direction by the fraction of the block located in zone 1. Due to such assignment, the block located across the guard area 2001 is entirely located in zone 0, and the first sector of the next block is located as the sector immediately after the guard area 2001 of zone 1. Accordingly, the first sector of the block can be located as each of recordable first sector in each zone with certainty.

Solid line 2213 in FIG. 22B shows the results of the assignment of the LSNs. As can be appreciated, as a result of the assignment of the LSNs, the LSNs corresponding to the fraction of the block are assigned to the sectors in zone 0. As can be appreciated, the assignment of the LSNs represented by solid line 2213 prevents the block from being located across the guard area 2001.

In the optical disk 1a, the location of the sector to which LSN:0 is to be assigned is calculated as a location fulfilling a prescribed capacity (4.7 GB), with the location of the sector to which the last LSN is assigned being fixed. The location is calculated based on the number of the defective sectors detected in each of the plurality of zones. LSN:0 is assigned to the sector positioned at the resultant location. The physical sector number of the sector to which the LSN:0 is assigned is stored in the entry of the DDS.

The LSN assigned to the first sector of each zone is stored in the entry of the DDS. By this operation, a high speed access to the first sector of each zone is realized without calculation.

Figure 22C:
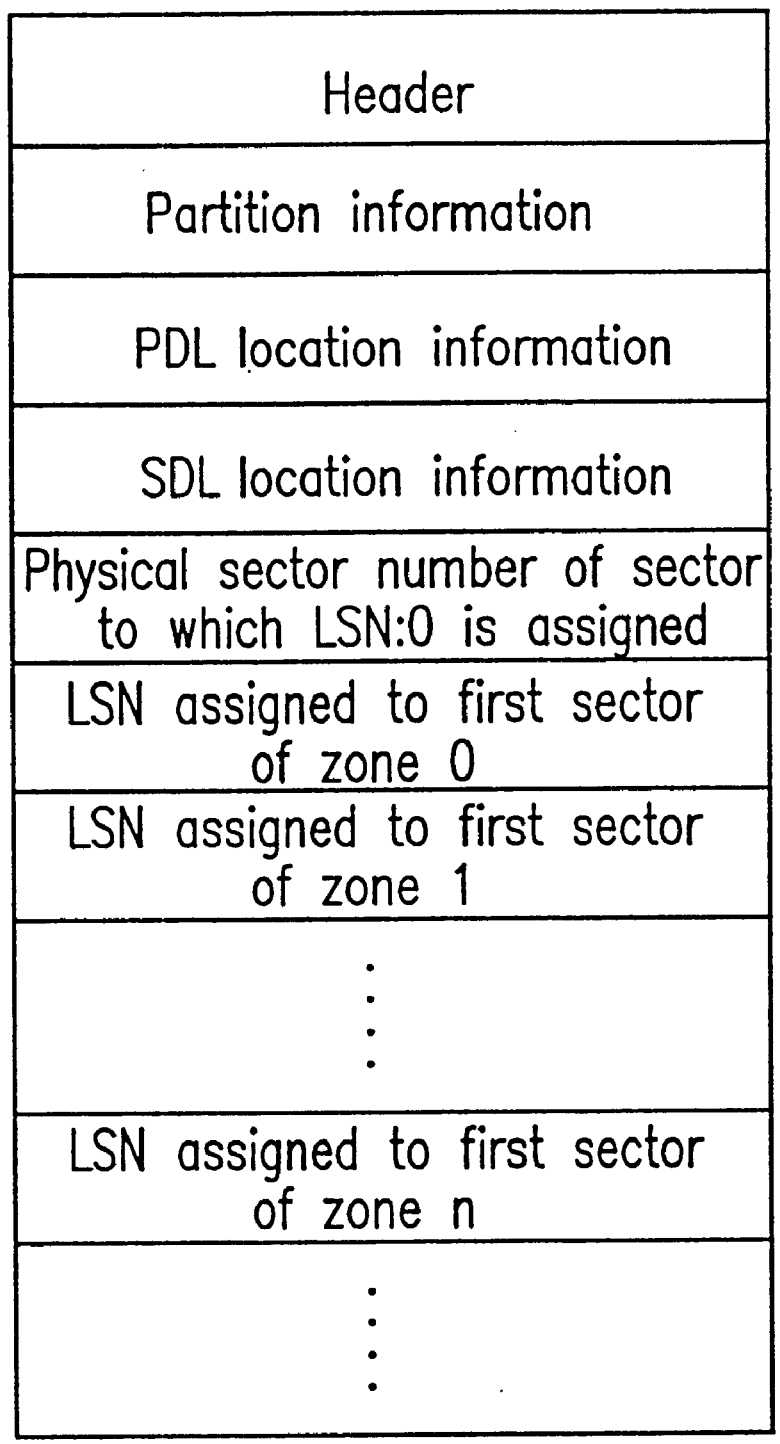
FIG. 22C is a diagram showing a structure of a DDS of the optical disk shown in FIG. 20.
Figure 23:
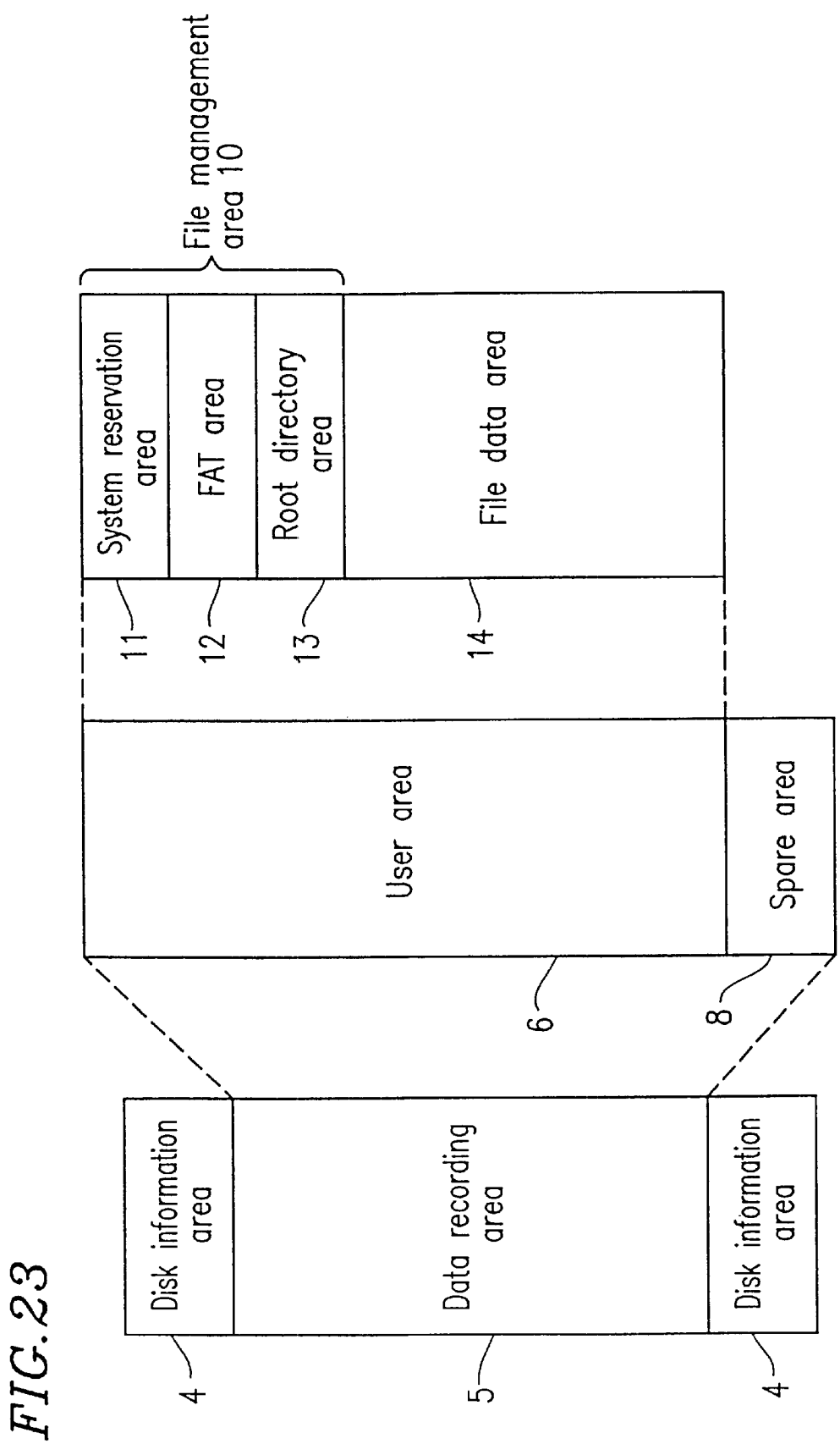
FIG. 23 is a diagram showing a logical structure of a conventional optical disk.
Figure 24:
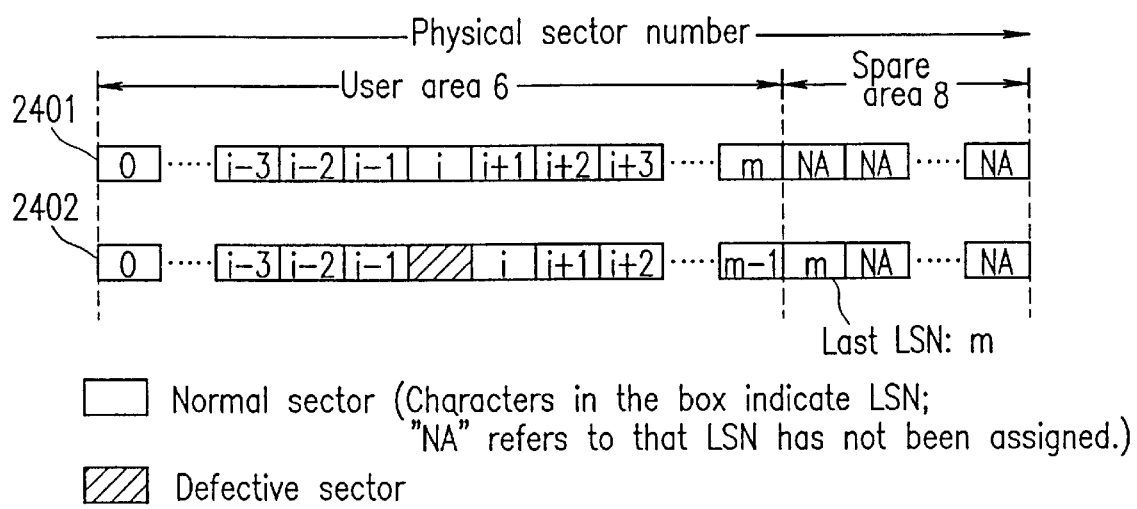
FIG. 24 is a conceptual view of a conventional slipping replacement algorithm.
Figure 25:
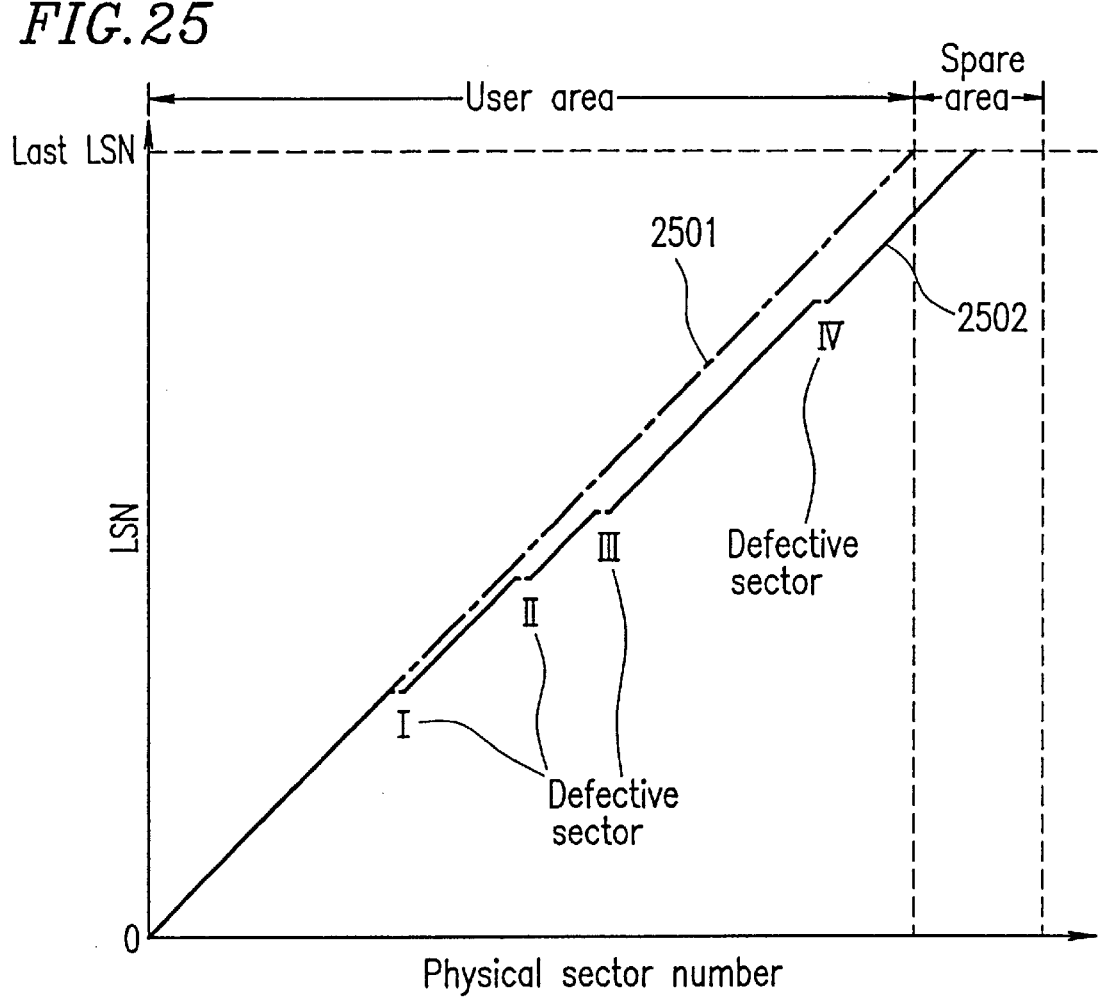
FIG. 25 is a graph illustrating the correspondence between physical sector numbers and LSNs of the conventional optical disk after the conventional slipping replacement algorithm is executed.
Figure 26:
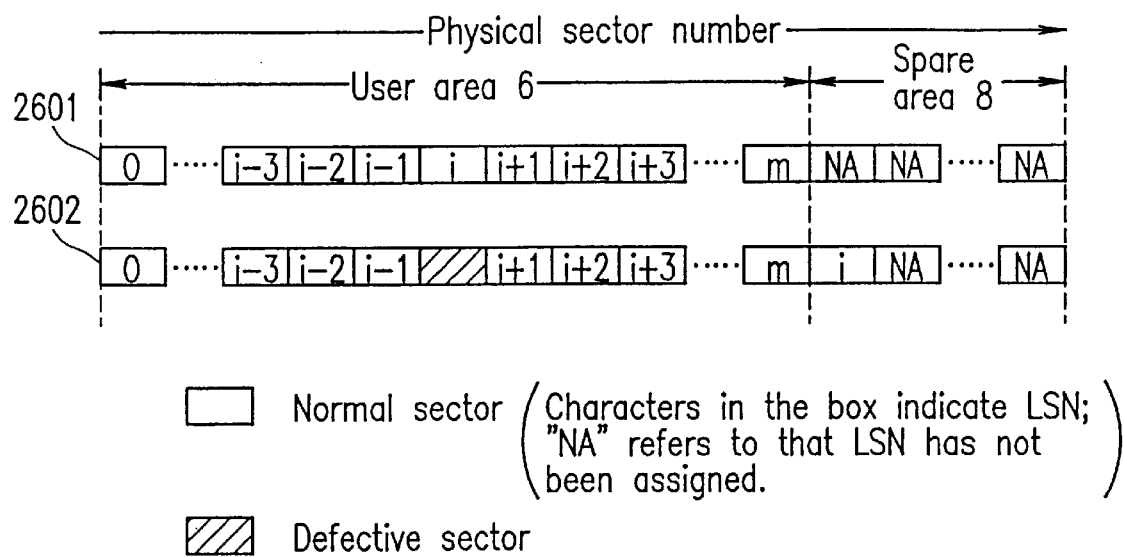
FIG. 26 is a conceptual view of a conventional linear replacement algorithm.

FIG. 22C shows a structure of the DDS. The DDS includes entries for storing the LSNs assigned to the first sector of each zone. The number of the entries is equal to the number of zones. For example, when the optical disk 1a includes two zones (zone 0 and zone 1), the DDS includes an entry for storing an LSN assigned to the first sector of zone 0 and an entry for storing an LSN assigned to the first sector of zone 1.

As described above, in the third example according to the present invention, a method for managing a defect of an optical disk having a plurality of zones is provided. Also provided in the third example according to the present invention is a method for managing a defect of such an optical disk for, when block-by-block recording is performed, preventing a block from being located across a guard area.

In the third example, the optical disk 1a has two zones. Alternatively, the optical disk can have three or more zones. Also, in such cases, LSNs can be assigned to sectors so that the first sector of the block is located as the recordable first sector of each zone.

As described above, according to an information recording medium of the present invention, a spare area is located radially inward from a user area. When a defective sector is detected in a file management area located in the vicinity of LSN:0, the defective sector is replaced with a replacing sector in the spare area in accordance with the linear replacement algorithm. Since the distance between the defective sector and the replacing sector is relatively small, a delay in access caused by the defective sector is relatively small. The file management area, which is accessed frequently, has a high possibility of including a defective sector. Accordingly, the above-described reduction in the delay in access caused by a defective sector detected in the file management area is significantly effective in shortening the time period required for recording or reproducing data.

A physical sector number of the sector to which LSN: 0 is assigned is stored in a disk information area. The physical sector number of the first sector in the replacement area (LR spare area) used in the linear replacement algorithm is fixed. The physical sector number of the last sector in the LR spare area may be determined by subtracting "1" from the physical sector number recorded in the disk information area. Accordingly, the location of the LR spare area can be obtained with substantially no calculation by referring to the physical sector number recorded in the disk information area.

When the information recording medium is divided into a plurality of zones, the defective sector detected in the file management area and the replacing sector are located in the same zone. Accordingly, no access to the file management area is to a plurality of zones. Thus, the time period required for recording or reproduction of data can be shortened.

When block-by-block recording is performed, the first sector of the block can be located as a recordable first sector in each zone. Accordingly, an access to a plurality of zones does not occur when recording to and reproduction from one block. This allows the time period required for recording or reproduction of data to be shortened. This also allows data in one block to be read continuously. Therefore, a memory for calculation and an operation apparatus which are required for preliminary pipeline processing can be curtailed without disturbing the pipeline processing of error correction.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disk, comprising:

an optical disk information area; and an optical disk data recording area including a plurality of sectors to which physical sector number are respectively assigned;

wherein:

the optical disk information area includes an area for recording a physical sector number of a sector to which a logical sector number "0" is assigned, among the plurality of sectors included in the optical disk data recording area.

2. An optical disk, comprising:

an optical disk information area; and an optical disk data recording area including a plurality of sectors to which physical sector number are respectively assigned;

wherein:

a physical sector number of a sector to which a logical sector number "0" is assigned, among the plurality of sectors included in the optical disk data recording area, is recorded in the optical disk information area.

* * * * *